United States Patent
Ohba et al.

(10) Patent No.: US 6,853,924 B2
(45) Date of Patent: Feb. 8, 2005

(54) DIFFUSION STATUS PREDICTION METHOD AND DIFFUSION STATUS PREDICTION SYSTEM FOR DIFFUSED SUBSTANCE

(75) Inventors: Ryohji Ohba, Nagasaki (JP); Seiichi Kudo, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 32 days.

(21) Appl. No.: 10/461,447

(22) Filed: Jun. 16, 2003

(65) Prior Publication Data

US 2004/0254740 A1 Dec. 16, 2004

(51) Int. Cl.[7] .............................................. G01N 31/00
(52) U.S. Cl. ............................. 702/26; 702/22; 702/23; 73/28.01; 73/23.2; 73/31.02; 73/31.01
(58) Field of Search .............................. 702/26, 22, 23; 73/28.01, 23.2, 31.02, 31.01

(56) References Cited

U.S. PATENT DOCUMENTS

| | | | | |
|---|---|---|---|---|
| 4,817,039 A | * | 3/1989 | Frost .............................. | 702/3 |
| 5,406,481 A | * | 4/1995 | Shinozawa et al. ............ | 702/3 |
| 5,648,914 A | * | 7/1997 | Bauer et al. .................. | 702/19 |
| 6,128,578 A | * | 10/2000 | Sakaino et al. ................ | 702/3 |
| 6,490,530 B1 | * | 12/2002 | Wyatt ........................... | 702/24 |
| 6,675,099 B2 | * | 1/2004 | Katsuhiro ....................... | 702/3 |

* cited by examiner

Primary Examiner—John Barlow
Assistant Examiner—Anthony T. Dougherty
(74) Attorney, Agent, or Firm—Birch, Stewart, Kolasch & Birch, LLP

(57) ABSTRACT

A diffusion status prediction method and system for a diffused substance are disclosed. The diffused substance is replaced by particles, and positions which the particles generated from an emission source arrive at are found by computation. The arrival positions and a post-emission elapsed time are recorded in association with each other. Also, intensity data showing the intensities of the particles during the passage of the post-emission elapsed time are set. Then, the intensity of the particles at the point in time at which the particles were generated is found by reference to the intensity data based on the post-emission elapsed time. For each particle, the arrival position, the post-emission elapsed time, and the intensity are recorded in association with each other. The concentration of the diffused substance in a predetermined area after a lapse of a predetermined time can be determined by adding up the intensities of the particles present in the predetermined area. In this manner, the diffusion status of the diffused substance emitted into the atmosphere is predicted.

5 Claims, 23 Drawing Sheets

Post-Emission Elapsed Time Ti(t)=20 Seconds

Fig. 24
Prior Art
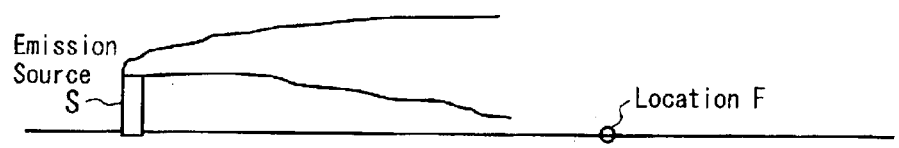
Fig. 25
Prior Art
(a) At Amount of Emission Varying with Time
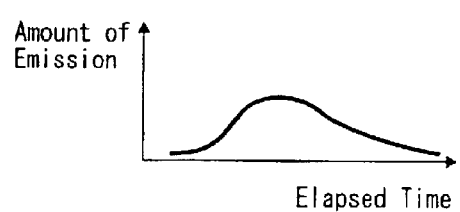
(b) Timewise Variations in Concentration at Downwind Location F
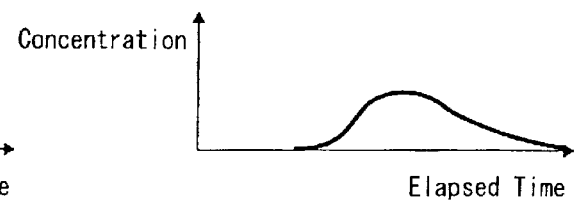

(a) At Constant Amount of Emission (b) Timewise Variations in Concentration at Downwind Location F (a) On Instantaneous Emission (b) Timewise Variations in Concentration at Downwind Location F

DIFFUSION STATUS PREDICTION METHOD AND DIFFUSION STATUS PREDICTION SYSTEM FOR DIFFUSED SUBSTANCE

The entire disclosure of Japanese Patent Application No. 2001-393179filed on Dec. 26, 2001, including specification, claims, drawings and summary, is incorporated herein by reference in its entirety.

BACKGROUND OF THE INVENTION

1. Field of the Invention

This invention relates to a diffusion status prediction method for a diffused substance. The invention is designed to predict how a substance (for example, a radioactive substance or smoke), emitted from a diffusion source (for example, facilities using a radioactive substance, and a chimney) into the atmosphere, will diffuse in the atmosphere, thereby estimating the concentrations of the substance varying with time at different locations.

2. Description of the Related Art

An atmospheric diffusion status prediction method is under development which, if a radioactive substance is emitted to the outside by accident of facilities dealing with the radioactive substance, estimates the diffusion range of the radioactive substance and the concentrations of the radioactive substance at different locations, thereby predicting areas which may be endangered by the radioactive substance.

This diffusion status prediction method can be applied not only in predicting the diffusion status of the radioactive substance, but also in calculating the concentrations of a gaseous body (smoke) at different locations if the gaseous body emitted from a chimney of a factory diffuses into the atmosphere, as well as in analyzing the diffusion status of an air pollutant for environmental impact assessment.

To predict the diffusion status of the substance, emitted into the atmosphere, by computation, it is necessary to carry out the following two computations:

(1) Meteorology predictive computation (2) Diffusion status predictive computation The meteorology predictive computation (1) is carried out as follows: Partial differential equations, which analyze atmospheric phenomena, are solved based on meteorological observation data such as those from meteorological GPV (Grid Point Value) database in Japan and meteorological databases of foreign countries. The solutions give wind directions and wind speeds at many evaluation locations (grid point positions) at constant time intervals during the period of time from the initial stage of an event (e.g., emission of a radioactive substance to the outside) until a point in time which is a predetermined time after the occurrence of the event. That is, the meteorology predictive computation (1) finds an atmospheric condition representing wind field data at constant time intervals.

The diffusion status predictive computation (2) is carried out as follows: The concentration and properties of the diffused substance emitted, and the above wind field data are substituted into a diffusion equation for computing the diffused state of the substance (particles), thereby obtaining the concentrations of the diffused substance at the respective grid point positions at the respective time intervals.

<Explanation for the Meteorology Predictive Computation>

The outline of the meteorology predictive computation will be offered first. The meteorological observation data, for example, meteorological GPV data, are delivered online from the Meteorological Business Support Center every 12 hours. The meteorological GPV data show meteorological data (wind velocity vectors (wind direction, wind speed), atmospheric pressure, temperature, moisture content) at locations (called "parent grid point positions") where a plurality of longitudinal virtual lines, which extend along a north-south direction on the earth's surface and which are spaced from each other in an east-west direction on the earth's surface by a prescribed distance (20 Km), cross a plurality of latitudinal virtual lines, which extend along the east-west direction on the earth's surface and which are spaced from each other in the north-south direction on the earth's surface by a prescribed distance (20 Km). In addition, the meteorological GPV data are delivered online as the meteorological data at the respective parent grid point positions which comprise a total of 51 hours of data obtained at 3-hour intervals, such as at the start of delivery, and 3 hours after, 6 hours after, and 9 hours after the start of delivery.

The above-mentioned meteorological data at the parent grid point positions, as the meteorological GPV data, involve a long distance of 20 Km between the parent grid point positions in terms of space, and a long interval of 3 hours in terms of time. Thus, the diffusion concentrations of the diffused substance cannot be computed only based on the gas status (wind direction, wind speed) data shown by the meteorological data at these parent grid point positions, namely, wind field data.

Hence, there is need to determine the atmospheric condition (wind direction, wind speed, etc.), which is detailed in terms of time as well as space, from the meteorological observation data rough spatially and rough timewise, by performing computations according to partial differential equations for analyzing atmospheric phenomena.

Thus, child grid point positions are set between parent grid point positions set in calculation areas to be calculated (specific areas preset in the earth's surface). The child grid point positions are arranged at the locations where a plurality of longitudinal virtual lines, which extend along the north-south direction on the earth's surface and which are spaced from each other in the east-west direction on the earth's surface by a constant distance (50 m), cross a plurality of latitudinal virtual lines, which extend along the east-wet direction on the earth's surface and which are spaced from each other in the north-south direction on the earth's surface by a constant distance (50 m).

The meteorological data at the child grid point positions and the parent grid point positions at predetermined time intervals (for example, 20-second intervals) from the start of computation are obtained by difference analysis computation according to partial differential equations, which analyze atmospheric phenomena. As the partial differential equations for analyzing atmospheric phenomena, there can be used fundamental equations for wind field analysis, which are represented by the RAMS (Regional Atmospheric Modeling System) code developed by Colorado State University and ATMET (a company in Colorado, USA).

The fundamental equations for wind field analysis, represented in the RAMS code, comprise equations of motion, an equation of thermal energy, an equation of moisture diffusion, and an equation of continuity, and are expressed as the following equations (1) to (6):

Equations of motion $$\frac{\partial u}{\partial t} = -u\frac{\partial u}{\partial x} - v\frac{\partial u}{\partial y} - w\frac{\partial u}{\partial z} - \theta\frac{\partial \pi'}{\partial x} + \tag{1}$$

$$fv + \frac{\partial}{\partial x}\left(K_m\frac{\partial u}{\partial x}\right) + \frac{\partial}{\partial y}\left(K_m\frac{\partial u}{\partial y}\right) + \frac{\partial}{\partial z}\left(K_m\frac{\partial u}{\partial z}\right)$$

$$\frac{\partial v}{\partial t} = -u\frac{\partial v}{\partial x} - v\frac{\partial v}{\partial y} - w\frac{\partial v}{\partial z} - \theta\frac{\partial \pi'}{\partial y} - \tag{2}$$

$$fu + \frac{\partial}{\partial x}\left(K_m\frac{\partial v}{\partial x}\right) + \frac{\partial}{\partial y}\left(K_m\frac{\partial v}{\partial y}\right) + \frac{\partial}{\partial z}\left(K_m\frac{\partial v}{\partial z}\right)$$

$$\frac{\partial w}{\partial t} = -u\frac{\partial w}{\partial x} - v\frac{\partial w}{\partial y} - w\frac{\partial w}{\partial z} - \theta\frac{\partial \pi'}{\partial z} - \tag{3}$$

$$\frac{g\theta'_v}{\theta_0} + \frac{\partial}{\partial x}\left(K_m\frac{\partial w}{\partial x}\right) + \frac{\partial}{\partial y}\left(K_m\frac{\partial w}{\partial y}\right) + \frac{\partial}{\partial z}\left(K_m\frac{\partial w}{\partial z}\right)$$

Equation of thermal energy $$\frac{\partial \theta_{il}}{\partial t} = -u\frac{\partial \theta_{il}}{\partial x} - v\frac{\partial \theta_{il}}{\partial y} + \frac{\partial \theta_{il}}{\partial z} + \tag{4}$$

$$\frac{\partial}{\partial x}\left(K_h\frac{\partial \theta_{il}}{\partial x}\right) + \frac{\partial}{\partial y}\left(K_h\frac{\partial \theta_{il}}{\partial y}\right) + \frac{\partial}{\partial z}\left(K_h\frac{\partial \theta_{il}}{\partial t}\right) + \left(\frac{\partial \theta_{il}}{\partial t}\right)_{rad}$$

Equation of moisture diffusion $$\frac{\partial r_n}{\partial t} = \tag{5}$$

$$-u\frac{\partial r_n}{\partial x} - v\frac{\partial r_n}{\partial y} - w\frac{\partial r_n}{\partial z} + \frac{\partial}{\partial x}\left(K_h\frac{\partial r_n}{\partial x}\right) + \frac{\partial}{\partial y}\left(K_h\frac{\partial r_n}{\partial y}\right) + \frac{\partial}{\partial z}\left(K_h\frac{\partial r_n}{\partial z}\right)$$

Equation of continuity $$\frac{\partial \pi'}{\partial t} = -\frac{R\pi_0}{c_v\rho_0\theta_0}\left(\frac{\partial \rho_0\theta_0 u}{\partial x} + \frac{\partial \rho_0\theta_0 v}{\partial y} + \frac{\partial \rho_0\theta_0 w}{\partial z}\right) \tag{6}$$

where u, v, w: wind speeds
f: Corioli's parameter
$K_m$: eddy viscosity coefficient of momentum
$K_h$: eddy diffusion coefficient of heat and moisture
$\theta_{il}$: potential temperature of moisture (ice-water)
$r_n$: mixing ratio of moisture such as rain or snow
ρ: density
rad: radiation
g: gravitational acceleration
π': Exner function (change)
$\theta_v$: temporary potential temperature
p: pressure
R: gas constant
$C_v$: isovolumic specific heat
Subscript 0: reference value In this manner, computations are made according to the fundamental equations for wind field analysis represented by the RAMS (Regional Atmospheric Modeling System) code to obtain wind direction vector data (wind field data) showing the meteorological data at the respective parent grid point positions and the meteorological data at the respective child grid point positions at predetermined time intervals (for example, 20-second intervals) from the start of computation.

<Explanation for Outline of Diffusion Status Predictive Computation>

Next, the diffusion status predictive computation will be explained. To perform the diffusion status predictive computation, the wind field data at the respective parent grid point positions and the respective child grid point positions at 20-second intervals, which were obtained by the RAMS (Regional Atmospheric Modeling System) code, were substituted, one after another, into the HYPACT (Hybrid Particle Concentration Transport Model) code developed by Colorado State University and ATMET. As a concrete example of the diffusion status predictive computation, Lagrangian particle dispersion model is adopted.

In the Lagrangian particle dispersion model, the diffusion velocities (u', v' and w') are calculated using equations (7) to (9) indicated below, and the respective particles are moved.

$$u'(t) = R_u u'(t - \Delta t) + (1 - R_u^2) r_u$$

$$v'(t) = R_v v'(t - \Delta t) + (1 - R_v^2) r_v$$

$$w'(t) = R_w w'(t - \Delta t) + (1 - R_w^2) r_w \tag{7}$$

where $R_u$, $R_v$ and $R_w$: Lagrange turbulent autocorrelation coefficient,
u'(t), v'(t) and w'(t): turbulent diffusion velocity component of particle, and
t: time.

$$R_u(\Delta t) = \frac{\overline{u'(t) \cdot u'(t - \Delta t)}}{\sigma_u^2} = \exp\left(-\frac{\Delta t}{T_{Lu}}\right) \tag{8}$$

$$R_v(\Delta t) = \frac{\overline{v'(t) \cdot v'(t - \Delta t)}}{\sigma_v^2} = \exp\left(-\frac{\Delta t}{T_{Lv}}\right)$$

$$R_w(\Delta t) = \frac{\overline{w'(t) \cdot w'(t - \Delta t)}}{\sigma_w^2} = \exp\left(-\frac{\Delta t}{T_{Lw}}\right)$$

where $\sigma_u$, $\sigma_v$, $\sigma_w$: turbulent velocity standard deviation,
$T_{Lu}$, $T_{Lv}$, $T_{Lw}$: Lagrange time scale, $$r_u = \sigma_u \eta_u, \; r_v = \sigma_v \eta_v, \; r_w = \sigma_w \eta_w + w_d \tag{9}$$

where $\eta_u$, $\eta_v$, $\eta_w$: normal random number (the mean is zero),
wd: gravitational sedimentation rate.

A concrete example will be described in which the wind field data at the respective parent grid point positions and the respective child arid point positions at 20-second intervals, which had been obtained by the RAMS (Regional Atmospheric Modeling System) code, were substituted, one after another, into the HYPACT (Hybrid Particle Concentration Transport Model) code to perform the diffusion status predictive computation.

To carry out this computation, a setting is made such that the substance emitted from the emission source into the atmosphere is converted into many particles P, and N (for example, twenty) particles P are generated from the position of the emission source in each computation cycle of $\Delta t$ (here $\Delta t$=20 seconds).

Concretely, 20 particles P are generated in each computation cycle of $\Delta t$ (20 seconds) such that 20 particles are generated at the start of computation, 20 particles are generated 20 seconds after the start of computation, 20 particles are generated 40 seconds after the start of computation, and so on. Also, the positions (spatial coordinates) of the respective particles P are found by computation in each computation cycle of $\Delta t$ (20 seconds).

The 20 particles P generated at the start of computation (time 0) are designated as $P_{00}^{01}$, $P_{00}^{02}$, $P_{00}^{03}$, $P_{00}^{04}$, $P_{00}^{05}$, $P_{00}^{06}$, $P_{00}^{07}$, $P_{00}^{08}$, $P_{00}^{09}$, $P_{00}^{10}$, $P_{00}^{11}$, $P_{00}^{12}$, $P_{00}^{13}$, $P_{00}^{14}$, $P_{00}^{15}$, $P_{00}^{16}$, $P_{00}^{17}$, $P_{00}^{18}$, $P_{00}^{19}$, and $P_{00}^{20}$.

The 20 particles P generated 20 seconds after the start of computation are designated as $P_{20}^{01}$, $P_{20}^{02}$, $P_{20}^{03}$, $P_{20}^{04}$, $P_{20}^{05}$, $P_{20}^{06}$, $P_{20}^{07}$, $P_{20}^{08}$, $P_{20}^{09}$, $P_{20}^{10}$, $P_{20}^{11}$, $P_{20}^{12}$, $P_{20}^{13}$, $P_{20}^{14}$, $P_{20}^{15}$, $P_{20}^{16}$, $P_{20}^{17}$, $P_{20}^{18}$, $P_{20}^{19}$, and $P_{20}^{20}$.

The 20 particles P generated 40 seconds after the start of computation are designated as $P_{40}^{01}$, $P_{40}^{02}$, $P_{40}^{03}$, $P_{40}^{04}$, $P_{40}^{05}$, $P_{40}^{06}$, $P_{40}^{07}$, $P_{40}^{08}$, $P_{40}^{09}$, $P_{40}^{10}$, $P_{40}^{11}$, $P_{40}^{12}$, $P_{40}^{13}$, $P_{40}^{14}$, $P_{40}^{15}$, $P_{40}^{16}$, $P_{40}^{17}$, $P_{40}^{18}$, $P_{40}^{19}$, $P_{40}^{20}$.

In the above designations, the figure shown in the lower row behind the symbol "P" represents the point of time elapsed after the start of computation, while the figure shown in the upper row behind the symbol "P" represents the particular particle of the twenty particles generated at this point of time. The particles generated at other points of time are designated similarly.

In detail, at the start of computation, the following 20 particles are generated from the emission source S: $P_{00}^{01}$, $P_{00}^{02}$, $P_{00}^{03}$, $P_{00}^{04}$, $P_{00}^{05}$, $P_{00}^{06}$, $P_{00}^{07}$, $P_{00}^{08}$, $P_{00}^{09}$, $P_{00}^{10}$, $P_{00}^{11}$, $P_{00}^{12}$, $P_{00}^{13}$, $P_{00}^{14}$, $P_{00}^{15}$, $P_{00}^{16}$, $P_{00}^{17}$, $P_{00}^{18}$, $P_{00}^{19}$, and $P_{00}^{20}$.

Twenty seconds after the start of computation, the following 20 particles are newly generated from the emission source S shown in FIG. 19: $P_{20}^{01}$, $P_{20}^{02}$, $P_{20}^{03}$, $P_{20}^{04}$, $P_{20}^{05}$, $P_{20}^{06}$, $P_{20}^{07}$, $P_{20}^{08}$, $P_{20}^{09}$, $P_{20}^{10}$, $P_{20}^{11}$, $P_{20}^{12}$, $P_{20}^{13}$, $P_{20}^{14}$, $P_{20}^{15}$, $P_{20}^{16}$, $P_{20}^{17}$, $P_{20}^{18}$, $P_{20}^{19}$, and $P_{20}^{20}$.

At this time, the particles generated at the start of computation, i.e., $P_{00}^{01}$, $P_{00}^{02}$, $P_{00}^{03}$, $P_{00}^{04}$, $P_{00}^{05}$, $P_{00}^{06}$, $P_{00}^{07}$, $P_{00}^{08}$, $P_{00}^{09}$, $P_{00}^{10}$, $P_{00}^{11}$, $P_{00}^{12}$, $P_{00}^{13}$, $P_{00}^{14}$, $P_{00}^{15}$, $P_{00}^{16}$, $P_{00}^{17}$, $P_{00}^{18}$, $P_{00}^{19}$, and $P_{00}^{20}$, arrive at positions remote from the emission source S while diffusing.

The positions of the respective particles P are determined by calculating the diffusion velocities (u', v', w') of the respective particles P in the Lagrangian particle dispersion model with the use of the wind field data at 20-second intervals obtained by the RAMS (Regional Atmospheric-Modeling System) code, and moving the respective particles based on the results.

Forty seconds after the start of computation, the following 20 particles are newly generated from the emission source S shown in FIG. 20: $P_{40}^{01}$, $P_{40}^{02}$, $P_{40}^{03}$, $P_{40}^{04}$, $P_{40}^{05}$, $P_{40}^{06}$, $P_{40}^{07}$, $P_{40}^{08}$, $P_{40}^{09}$, $P_{40}^{10}$, $P_{40}^{11}$, $P_{40}^{12}$, $P_{40}^{13}$, $P_{40}^{14}$, $P_{40}^{15}$, $P_{40}^{16}$, $P_{40}^{17}$, $P_{40}^{18}$, $P_{40}^{19}$, $P_{40}^{20}$.

At this time, the particles generated at the start of computation, i.e., $P_{00}^{01}$, $P_{00}^{02}$, $P_{00}^{03}$, $P_{00}^{04}$, $P_{00}^{05}$, $P_{00}^{06}$, $P_{00}^{07}$, $P_{00}^{08}$, $P_{00}^{09}$, $P_{00}^{10}$, $P_{00}^{11}$, $P_{00}^{12}$, $P_{00}^{13}$, $P_{00}^{14}$, $P_{00}^{15}$, $P_{00}^{16}$, $P_{00}^{17}$, $P_{00}^{18}$, $P_{00}^{19}$, and $P_{00}^{20}$, reach positions further remote from the emission source S while diffusing further.

Moreover, the following 20 particles generated 20 seconds after the start of computation, $P_{20}^{01}$, $P_{20}^{02}$, $P_{20}^{03}$, $P_{20}^{04}$, $P_{20}^{05}$, $P_{20}^{06}$, $P_{20}^{07}$, $P_{20}^{08}$, $P_{20}^{09}$, $P_{20}^{10}$, $P_{20}^{11}$, $P_{20}^{12}$, $P_{20}^{13}$, $P_{20}^{14}$, $P_{20}^{15}$, $P_{20}^{16}$, $P_{20}^{17}$, $P_{20}^{18}$, $P_{20}^{19}$, and $P_{20}^{20}$, arrive at positions remote from the emission source S while diffusing.

The positions of the respective particles P are determined by calculating the diffusion velocities (u', v', w') of the respective particles P in the Lagrangian particle dispersion model with the use of the wind field data at 20-second intervals obtained by the RAMS (Regional Atmospheric Modeling System) code, and moving respective particles based on the results.

Sixty seconds after the start of computation, following 20 particles are newly generated from the emission source S shown in FIG. 21: $P_{60}^{01}$, $P_{60}^{02}$, $P_{60}^{03}$, $P_{60}^{04}$, $P_{60}^{05}$, $P_{60}^{06}$, $P_{60}^{07}$, $P_{60}^{08}$, $P_{60}^{09}$, $P_{60}^{10}$, $P_{60}^{11}$, $P_{60}^{12}$, $P_{60}^{13}$, $P_{60}^{14}$, $P_{60}^{15}$, $P_{60}^{16}$, $P_{60}^{17}$, $P_{60}^{18}$, $P_{60}^{19}$, and $P_{60}^{20}$.

At this time, the particles generated at the of computation, i.e. $P_{00}^{01}$, $P_{00}^{02}$, $P_{00}^{03}$, $P_{00}^{04}$, $P_{00}^{05}$, $P_{00}^{06}$, $P_{00}^{07}$, $P_{00}^{08}$, $P_{00}^{09}$, $P_{00}^{10}$, $P_{00}^{11}$, $P_{00}^{12}$, $P_{00}^{13}$, $P_{00}^{14}$, $P_{00}^{15}$, $P_{00}^{16}$, $P_{00}^{17}$, $P_{00}^{18}$, $P_{00}^{19}$, and $P_{00}^{20}$, reach positions further remote from the emission source S while diffusing further.

Moreover, the following 20 particles generated 20 seconds after the start of computation, $P_{20}^{01}$, $P_{20}^{02}$, $P_{20}^{03}$, $P_{20}^{04}$, $P_{20}^{05}$, $P_{20}^{06}$, $P_{20}^{07}$, $P_{20}^{08}$, $P_{20}^{09}$, $P_{20}^{10}$, $P_{20}^{11}$, $P_{20}^{12}$, $P_{20}^{13}$, $P_{20}^{14}$, $P_{20}^{15}$, $P_{20}^{16}$, $P_{20}^{17}$, $P_{20}^{18}$, $P_{20}^{19}$, and $P_{20}^{20}$, arrive at positions further remote from the emission source S while diffusing further.

Furthermore, the following 20 particles generated 40 seconds after the start of computation, $P_{40}^{01}$, $P_{40}^{02}$, $P_{40}^{03}$, $P_{40}^{04}$, $P_{40}^{05}$, $P_{40}^{06}$, $P_{40}^{07}$, $P_{40}^{08}$, $P_{40}^{09}$, $P_{40}^{10}$, $P_{40}^{11}$, $P_{40}^{12}$, $P_{40}^{13}$, $P_{40}^{14}$, $P_{40}^{15}$, $P_{40}^{16}$, $P_{40}^{17}$, $P_{40}^{18}$, $P_{40}^{19}$, $P_{40}^{20}$, reach positions remote from the emission source S while diffusing.

The positions of the respective particles P are determined by calculating the diffusion velocities (u', v', w') of the respective particles P in the Lagrangian particle dispersion model with the use of the wind field data at 20-second intervals obtained by the RAMS (Regional Atmospheric Modeling System) code, and moving the respective particles based on the results.

As described above, groups of 20 particles are generated successively in respective computation cycles of $\Delta t$ (20 seconds) and, at the same time, the position, i.e., spatial coordinates (xi(t), yi(t), zi(t)), of each particle in each computation cycle of $\Delta t$ (20 seconds) is determined.

If the particles P are present in a unit space (a unit volume in a predicted area) separated by a predetermined distance from the emission source S when a predetermined period of time has elapsed since the start of computation, as shown in FIG. 22, the concentration of the substance in this unit space can be calculated from the number of these particles.

In detail, assume that the substance in an amount of Q (m³/second) is emitted at the emission source S. Since the particles P are generated at a rate of 20 particles in 20 seconds (namely, one particle per second), each particle P has an emission source intensity of Q/1 (m³). Thus, the number of the particles P present in the unit space is multiplied by the emission source intensity of Q/1 (m³), whereby the concentration of the substance in this unit space can be determined.

The foregoing concrete example will be described generally as follows: A substance, such as a gaseous body, emitted from the emission source is replaced by many particles. N particles per second are emitted from the emission source. In this case, the calculated amount of emission of the particles is N/sec. If the actual amount of emission of the substance emitted from the emission source is Q (m³/sec), each particle has an emission source intensity of Q/N (m³).

The equations of particle motion are numerically calculated in an unsteady manner for each particle. That is, the wind field data obtained by the RAMS (Regional Atmosphere Modeling System) code are substituted into the HYPACT (Hybrid Particle Concentration Transport Model) code which covers the equations of motion of particles, the diffusion velocities (u', v', w') of each particle P are calculated using the Lagrangian particle dispersion model, and the respective particles are moved. In this manner, the coordinates of each particle can be determined unsteadily. In other words, the spatial coordinates of each particle can be determined in each computation cycle of $\Delta t$. The data on each particle, obtained by the Lagrangian particle model and recorded into a data recorder, are only the spatial coordinates (xi(t), yi(t), zi(t)) of each particle.

The HYPACT code, which represents the equations of motion of particles (substance), expresses the advection, diffusion and gravitational sedimentation phenomena of particles. The advection phenomenon of particles depends on the time-averaged velocity of the atmosphere, the diffusion phenomenon of particles depends on the turbulent velocity of the atmosphere, and the gravitational sedimentation of particles depends on the mass of particles, gravitational acceleration, and viscosity coefficient of air (see FIG. 23).

If the number of particles in the unit volume in the air is n, the gas concentration (substance concentration) in this space is n×Q/N (gas $M^3$/air $m^3$), namely, the product of the number n of particles present in this unit space and the emission source intensity Q/N which each particle has.

This environmental concentration (the substance concentration in the unit volume) depends on timewise variations in the amount of emission of the substance emitted. Thus, under conditions where the amount of emission varies with time, calculation of diffusion needs to be made for each of the emission conditions. If there are many emission conditions which can be anticipated, it is necessary to carry out calculations for diffusion corresponding to different cases of the amount of emission. This requires a huge calculation time.

That is, as shown in FIG. 24, when a gas (substance) is emitted from an emission source S (e.g., a chimney), for example, timewise variations in the gas concentration at a location F downwind of the emission source S depend on timewise variations in the substance emitted from the emission source S.

In detail, if the amount of emission of the substance varies with time as in FIG. 25(a), the concentration of the substance at the location F varies with time as in FIG. 25(b). If the amount of emission of the substance is constant as in FIG. 26(a), the concentration of the substance at the location F rises to a constant value and then remains constant as in FIG. 26(b). If the substance is emitted instantaneously as in FIG. 27(a), the concentration of the substance at the location F rises transiently and then falls to zero as in FIG. 27(b).

If the amount of emission of the substance varies with the passage of time, as described above, the number of the particles generated needs to be changed over time in correspondence with the amount of emission of the substance. Then, the positions which the generated particles, whose number was changed with the passage of time in this manner, are moved to are found. From these positions to which the particles moved, the concentration of the substance is calculated. Thus, calculations of diffusion must be carried out for different cases where the amount of emission varies by itself and over time. This necessitates enormous calculation results.

In an accident in which a radioactive substance is emitted to the outside at facilities handling the radioactive substance, for example, a very large number of substances (e.g., about 100 kinds of substances) are emitted. Moreover, the amount of emission of each substance differs according to time. Thus, the number of particles generated is changed for each substance with the passage of time in correspondence with the amount of emission of each substance. A determination is made of where the generated particles, thus changed in number, are moved to. From these positions to which the particles are moved, the concentration of the substance is calculated. In case of the accident, therefore, there is need to carry out 100 kinds of diffusion calculations corresponding to 100 kinds of substances, for example.

SUMMARY OF THE INVENTION

The present invention has been accomplished in the light of the problems with the earlier technologies. Its object is to provide a diffusion status prediction method for a diffused substance, and a diffusion status prediction system for a diffused substance, by which the diffusion status of the substance can be predictively computed in a short time, even if many kinds of substances are emitted and the amount of emission of each substance varies with time.

To attain the above object, there is provided, according to an aspect of the present invention, a diffusion status prediction method for a diffused substance, comprising the steps of:

making a setting such that a substance emitted from an emission source into an atmosphere is replaced by many particles, and a preset number of the particles are generated from a position of the emission source in each of computation cycles, in order to predict a status of diffusion of the emitted substance into the atmosphere;

substituting wind field data, which are obtained at many locations in an area including the position of the emission source and which show a wind direction and a wind speed varying with passage of time, into a diffusion equation for computing a diffusion state of the particles, to find diffusion velocities of the respective particles; finding spatial coordinates, which show spatial positions where the respective particles are present, from the diffusion velocities in each of the computation cycles; also measuring a post-emission elapsed time, which is a time elapsed since the particles were first generated; and recording the spatial coordinates of the respective particles and the post-emission elapsed time of the respective particles in each computation cycle into a data recorder, with the spatial coordinates and the post-emission elapsed time being associated with each other;

setting emission source intensity data on the particles over a time course of the post-emission elapsed time in proportion to variations in an amount of emission of the emitted substance over the time course of the post-emission elapsed time;

reading out the spatial coordinates of the respective particles and the post-emission elapsed time of the respective particles in each computation cycle which have been recorded in the data recorder, and also finding a point of time, at which the respective particles were generated, by reference to the post-emission elapsed time read out; finding the emission source intensity of the respective particles at this point of time from the emission source intensity data; and rerecording the spatial coordinates of the respective particles, the post-emission elapsed time of the respective particles, and the emission source intensity of the respective particles in each computation cycle into the data recorder, with the spatial coordinates, the post-emission elapsed time, and the emission source intensity being associated with each other; and determining a concentration of the substance in a predetermined area in a predetermined computation cycle by adding together the emission source intensities of all the particles present in the predetermined area in the predetermined computation cycle.

Because of the above feature, even if the amount of the substance emitted from the emission source is different from its value initially predicted, the concentration of the substance in a specific area can be computed in a short time.

According to another aspect of the present invention, there is provided a diffusion status prediction method for a diffused substance, comprising the steps of:

making a setting such that a substance emitted from a plurality of emission sources into an atmosphere is replaced by many particles, and a preset number of the particles are generated from a position of each of the emission sources in each of computation cycles, in order to predict a status of diffusion of the emitted substance into the atmosphere;

substituting wind field data, which are obtained at many locations in an area including the positions of the emission sources and which show a wind direction and a wind speed varying with passage of time, into a diffusion equation for computing a diffusion state of the particles, to find diffusion velocities of the respective particles; finding spatial coordinates, which show spatial positions where the respective particles are present, from the diffusion velocities in each of the computation cycles; also measuring a post-emission elapsed time, which is a time elapsed since the particles were first generated; and recording the spatial coordinates of the respective particles, the post-emission elapsed time of the respective particles, and emission source identification information for identification of either of the emission sources in each computation cycle, into a data recorder, with the spatial coordinates, the post-emission elapsed time, and the emission source identification information being associated with each other;

setting, for each of the emission sources, emission source intensity data on the particles along a time course of the post-emission elapsed time in proportion to variations in an amount of emission, along the time course of the post-emission elapsed time, of the substance emitted from each of the emission sources;

reading out the spatial coordinates of the respective particles, the post-emission elapsed time of the respective particles, and the emission source identification information on the respective particles in each computation cycle which have been recorded in the data recorder, and also finding a point of time, at which the respective particles were generated, by reference to the post-emission elapsed time read out; finding the emission source intensity of the respective particles at the point of time, at which the particles were generated, from the emission source intensity data corresponding to the emission source, where the particles were generated, by reference to the emission source identification information read out; and rerecording the spatial coordinates of the respective particles, the post-emission elapsed time of the respective particles, and the emission source intensity of the respective particles in each computation cycle into the data recorder, with the spatial coordinates, the post-emission elapsed time, and the emission source intensity being associated with each other; and determining a concentration of the substance in a predetermined area in a predetermined computation cycle by adding together the emission source intensities of all the particles present in the predetermined area in the predetermined computation cycle.

Because of the above feature, even if the amount of the substance emitted from the emission source is different from its value initially predicted, the concentration of the substance in a specific area can be computed in a short time. Moreover, even if the substance is emitted from the plural emission sources, the concentration of the substance can be calculated accurately.

In the diffusion status prediction method for a diffused substance according to the present invention, the emission source intensity data which are set may have been obtained by measuring the concentration of the substance actually emitted from the emission source.

Alternatively, the emission source intensity data may be set based on timewise variations in the concentration of the substance measured at an observation point in surroundings of the emission source.

Thus, even if data on the concentration of the substance emitted from the emission source are not obtained beforehand, the concentration of the substance can be calculated using data from actual measurements.

According to a further aspect of the present invention, there is provided a diffusion status prediction system for a diffused substance, comprising:

a business organization which, when the diffused substance is emitted into an atmosphere, measures a concentration of the diffused substance and transmits data showing an amount of emission of the diffused substance;

a meteorological data delivery facility for delivering meteorological observation data;

supervisory authorities for advising the business organization and residents in a neighborhood of the business organization to evacuate; and a safety analysis center for performing predictive computations on the diffusion status of the diffused substance to compute the concentration of the substance in the predetermined area, and wherein:

the safety analysis center receives the data showing the amount of emission of the diffused substance transmitted from the business organization, and the meteorological observation data transmitted from the meteorological data delivery facility, via information transfer means;

the supervisory authorities receive the concentration of the substance transmitted from the safety analysis center via the information transfer means; and the supervisory authorities give advice to evacuate, depending on the concentration of the substance transmitted.

Because of the above feature, the supervisory authorities can promptly offer advice to evacuate, based on information from the results of computation at the safety analysis center, so that measures for evacuation of nearby residences can be taken urgently.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 24 is an explanation drawing showing an emission source and a downwind location;

FIGS. 25(a) and 25(b) are characteristic views showing the relationship between the amount of emission and the concentration when the amount of emission varies with time;

DESCRIPTION OF THE PREFERRED EMBODIMENTS

Preferred embodiments of the present invention will now be described in detail with reference to the accompanying drawings, which in no way limit the invention.

<First Embodiment (A Single Emission Source)>

A diffusion status prediction method for a diffused substance according to a first embodiment of the present invention will be described with reference to FIGS. 1 to 10(a) and 10(b).

Figure 2:
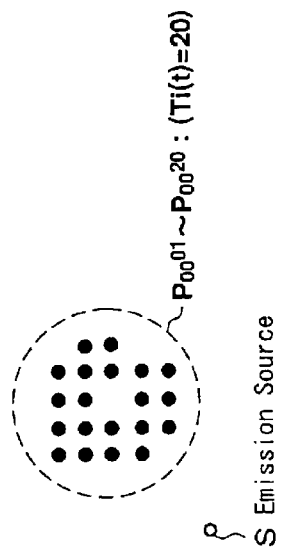
FIG. 2 is an explanation drawing showing the diffusion state of particles in the first embodiment of the present invention.
Figure 3:
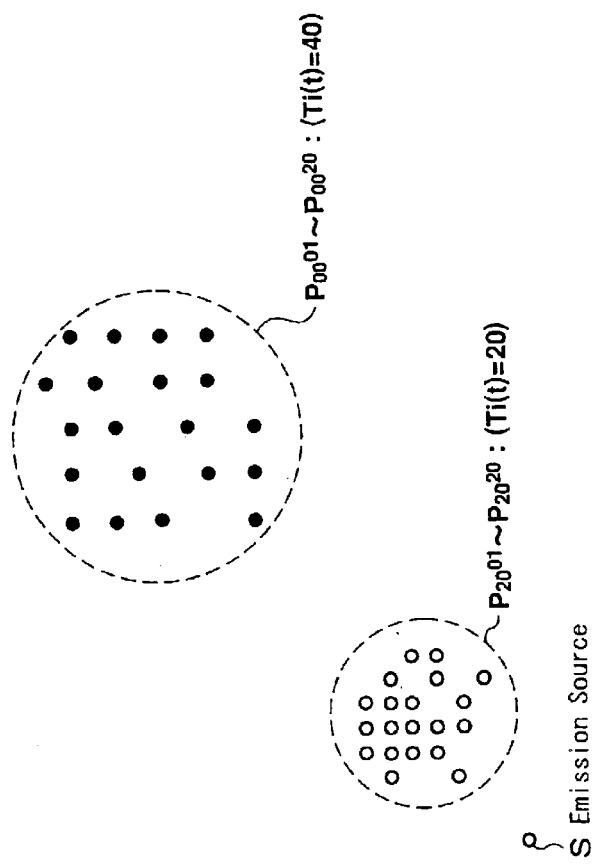
FIG. 3 is an explanation drawing showing the diffusion state of particles in the first embodiment of the present invention.
Figure 4:
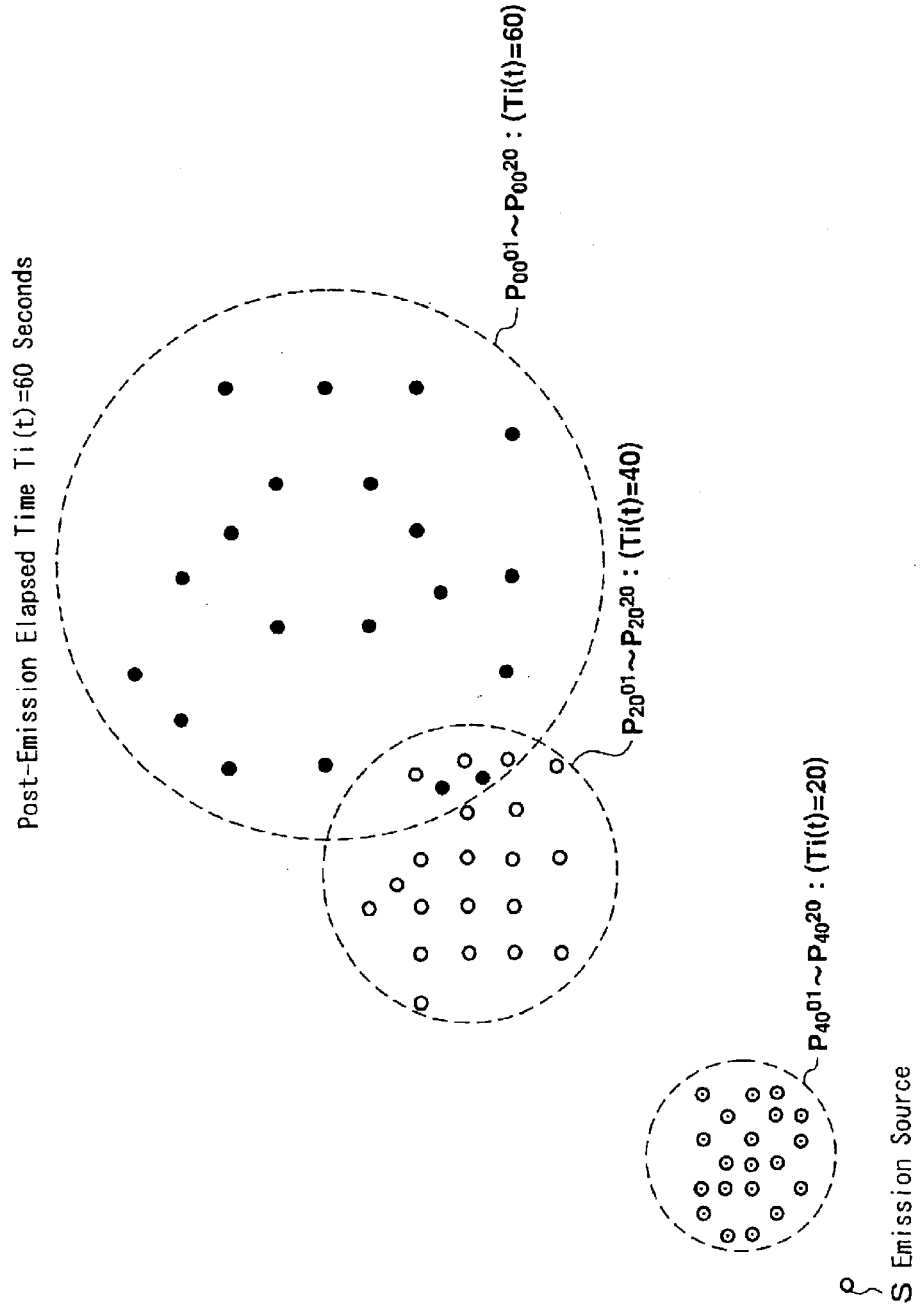
FIG. 4 is an explanation drawing showing the diffusion state of particles in the first embodiment of the present invention.

In the first step of the first embodiment (see FIG. 1, a flow chart for calculations), the following processings are performed: Whether the amount of emission of a substance actually emitted from an emission source S (see FIGS. 2 to 4 showing the diffusion status of particles) is constant or varies with the passage of time, the behavior of particles is numerically calculated using the conventional Lagrangian particle dispersion model, with the amount of emission, Q ($m^3$/sec), of the substance being set at a constant value (=1.0). Furthermore, in addition to spatial coordinates (xi(t), yi(t), zi(t)), i.e. information possessed by each particle, post-emission elapsed time Ti (t), i.e. time which has elapsed since the initial generation of particles, is recorded into a data recorder 1 in each computation cycle of $\Delta t$.

The processings in this first step are explained concretely as follows: According to this computation, 20 particles are generated in each computation cycle of $\Delta t$ (20 seconds), and the position (spatial coordinates) of a particle P is computed in each computation cycle of $\Delta t$ (20 seconds).

At the start of computation, the following 20 particles are generated from the emission source S: $P_{00}^{01}$, $P_{00}^{02}$, $P_{00}^{03}$, $P_{00}^{04}$, $P_{00}^{05}$, $P_{00}^{06}$, $P_{00}^{07}$, $P_{00}^{08}$, $P_{00}^{09}$, $P_{00}^{10}$, $P_{00}^{11}$, $P_{00}^{12}$, $P_{00}^{13}$, $P_{00}^{14}$, $P_{00}^{15}$, $P_{00}^{16}$, $P_{00}^{17}$, $P_{00}^{18}$, $P_{00}^{19}$, and $P_{00}^{20}$.

Twenty seconds after the start of computation, the following 20 particles are newly generated from the emission source S shown in FIG. 2: $P_{20}^{01}$, $P_{20}^{02}$, $P_{20}^{03}$, $P_{20}^{04}$, $P_{20}^{05}$, $P_{20}^{06}$, $P_{20}^{07}$, $P_{20}^{08}$, $P_{20}^{09}$, $P_{20}^{10}$, $P_{20}^{11}$, $P_{20}^{12}$, $P_{20}^{13}$, $P_{20}^{14}$, $P_{20}^{15}$, $P_{20}^{16}$, $P_{20}^{17}$, $P_{20}^{18}$, $P_{20}^{19}$, and $P_{20}^{20}$.

At this time, the particles generated at the start of computation, i.e., $P_{00}^{01}$, $P_{00}^{02}$, $P_{00}^{03}$, $P_{00}^{04}$, $P_{00}^{05}$, $P_{00}^{06}$, $P_{00}^{07}$, $P_{00}^{08}$, $P_{00}^{09}$, $P_{00}^{10}$, $P_{00}^{11}$, $P_{00}^{12}$, $P_{00}^{13}$, $P_{00}^{14}$, $P_{00}^{15}$, $P_{00}^{16}$, $P_{00}^{17}$, $P_{00}^{18}$, $P_{00}^{19}$, and $P_{00}^{20}$, arrive at positions remote from the emission source S while diffusing.

The positions of the respective particles, $P_{00}^{01}$ to $P_{00}^{20}$, are determined by calculating the diffusion velocities (u', v', w') of the respective particles, $P_{00}^{01}$ to $P_{00}^{20}$, in the Lagrangian particle dispersion model with the use of the wind field data at 20-second intervals obtained by the RAMS (Regional Atmospheric Modeling System) code, and moving the respective particles based on the results.

For the particles generated at the start of computation, i.e., $P_{00}^{01}$ to $P_{00}^{20}$, 20 seconds have passed since the start of computation (the point in time at which the particles were first generated). Thus, the respective spatial coordinates (xi(t=20), yi(t=20), zi(t=20)) of the respective particles $P_{00}^{01}$ to $P_{00}^{20}$ are recorded, while associated with the post-emission elapsed time Ti(t)=20 seconds, into the data recorder 1 (see FIGS. 1 and 2).

Forty seconds after the start of computation, the following 20 particles are newly generated from the emission source S shown in FIG. 3: $P_{40}^{01}$, $P_{40}^{02}$, $P_{40}^{03}$, $P_{40}^{04}$, $P_{40}^{05}$, $P_{40}^{06}$, $P_{40}^{07}$, $P_{40}^{08}$, $P_{40}^{09}$, $P_{40}^{10}$, $P_{40}^{11}$, $P_{40}^{12}$, $P_{40}^{13}$, $P_{40}^{14}$, $P_{40}^{15}$, $P_{40}^{16}$, $P_{40}^{17}$, $P_{40}^{18}$, $P_{40}^{19}$, and $P_{40}^{20}$.

At this time, the particles generated at the start of computation, i.e., $P_{00}^{01}$, $P_{00}^{02}$, $P_{00}^{03}$, $P_{00}^{04}$, $P_{00}^{05}$, $P_{00}^{06}$, $P_{00}^{07}$, $P_{00}^{08}$, $P_{00}^{09}$, $P_{00}^{10}$, $P_{00}^{11}$, $P_{00}^{12}$, $P_{00}^{13}$, $P_{00}^{14}$, $P_{00}^{15}$, $P_{00}^{16}$, $P_{00}^{17}$, $P_{00}^{18}$, $P_{00}^{19}$, and $P_{00}^{20}$, reach positions further remote from the emission source S while diffusing further.

On the other hand, the following 20 particles generated 20 seconds after the start of computation, $P_{20}^{01}$, $P_{20}^{02}$, $P_{20}^{03}$, $P_{20}^{04}$, $P_{20}^{05}$, $P_{20}^{06}$, $P_{20}^{07}$, $P_{20}^{08}$, $P_{20}^{09}$, $P_{20}^{10}$, $P_{20}^{11}$, $P_{20}^{12}$, $P_{20}^{13}$, $P_{20}^{14}$, $P_{20}^{15}$, $P_{20}^{16}$, $P_{20}^{17}$, $P_{20}^{18}$, $P_{20}^{19}$, and $P_{20}^{20}$, arrive at positions remote from the emission source S while diffusing.

The positions of the respective particles, $P_{00}^{01}$ to $P_{00}^{20}$ and $P_{20}^{01}$ to $P_{20}^{20}$, are determined by calculating the diffusion velocities (u', v', w') of the respective particles, $P_{00}^{01}$ to $P_{00}^{20}$ and $P_{20}^{01}$ to $P_{20}^{20}$ in the Lagrangian particle dispersion model with the use of the wind field data at 20-second intervals obtained by the RAMS (Regional Atmospheric Modeling System) code, and moving the respective particles based on the results.

For the particles generated at the start of computation, i.e., $P_{00}^{01}$ to $P_{00}^{20}$, 40 seconds have passed since the start of computation (the point in time at which the particles were first generated). Thus, the respective spatial coordinates (xi(t=40), yi(t=40), zi(t=40)) of the respective particles $P_{00}^{01}$ to $P_{00}^{20}$ are recorded, while associated with the post-emission elapsed time Ti(t)=40 seconds, into the data recorder 1 (see FIGS. 1 and 3).

Figure 1:
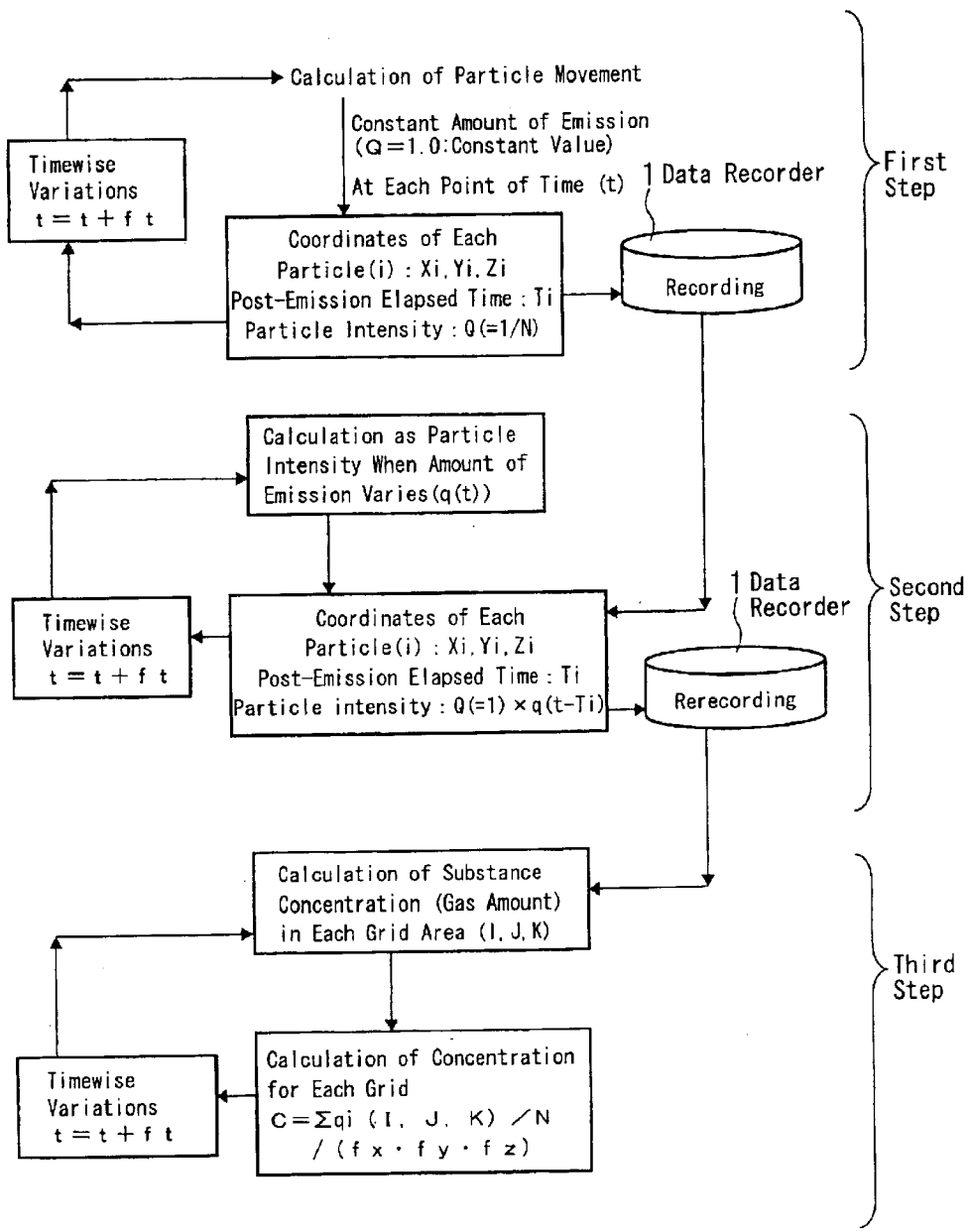
FIG. 1 is a flow chart showing the flow of calculations in a first embodiment of the present invention.

For the particles generated 20 seconds after the start of computation, i.e., $P_{20}^{01}$ to $P_{20}^{20}$, 20 seconds have passed since the start of computation (the point in time at which the particles were first generated) Thus, the respective spatial coordinates (xi(t=40), yi(t=40), zi(t=40)) of the respective particles $P_{20}^{01}$ to $P_{20}^{20}$ are recorded, while associated with the post-emission elapsed time Ti(t)=20 seconds, into the data recorder 1 (see FIGS. 1 and 3).

Sixty seconds after the start of computation, the following 20 particles are newly generated from the emission source S shown in FIG. 4: $P_{60}^{01}$, $P_{60}^{02}$, $P_{60}^{03}$, $P_{60}^{04}$, $P_{60}^{05}$, $P_{60}^{06}$, $P_{60}^{07}$, $P_{60}^{08}$, $P_{60}^{09}$, $P_{60}^{10}$, $P_{60}^{11}$, $P_{60}^{12}$, $P_{60}^{13}$, $P_{60}^{14}$, $P_{60}^{15}$, $P_{60}^{16}$, $P_{60}^{17}$, $P_{60}^{18}$, $P_{60}^{19}$, and $P_{60}^{20}$.

At this time, the particles generated at the start of computation, i.e., $P_{00}^{01}$, $P_{00}^{02}$, $P_{00}^{03}$, $P_{00}^{04}$, $P_{00}^{05}$, $P_{00}^{06}$, $P_{00}^{07}$, $P_{00}^{08}$, $P_{00}^{09}$, $P_{00}^{10}$, $P_{00}^{11}$, $P_{00}^{12}$, $P_{00}^{13}$, $P_{00}^{14}$, $P_{00}^{15}$, $P_{00}^{16}$, $P_{00}^{17}$, $P_{00}^{18}$, $P_{00}^{19}$, and $P_{00}^{20}$, reach positions still further remote from the emission source S while diffusing still further.

The following 20 particles generated 20 seconds after the start of computation, $P_{20}^{01}$, $P_{20}^{02}$, $P_{20}^{03}$, $P_{20}^{04}$, $P_{20}^{05}$, $P_{20}^{06}$, $P_{20}^{07}$, $P_{20}^{08}$, $P_{20}^{09}$, $P_{20}^{10}$, $P_{20}^{11}$, $P_{20}^{12}$, $P_{20}^{13}$, $P_{20}^{14}$, $P_{20}^{15}$, $P_{20}^{16}$, $P_{20}^{17}$, $P_{20}^{18}$, $P_{20}^{19}$, and $P_{20}^{20}$, arrive at positions further remote from the emission source S while diffusing further.

The following 20 particles generated 40 seconds after the start of computation, $P_{40}^{01}$, $P_{40}^{02}$, $P_{40}^{03}$, $P_{40}^{04}$, $P_{40}^{05}$, $P_{40}^{06}$, $P_{40}^{07}$, $P_{40}^{08}$, $P_{40}^{09}$, $P_{40}^{10}$, $P_{40}^{11}$, $P_{40}^{12}$, $P_{40}^{13}$, $P_{40}^{14}$, $P_{40}^{15}$, $P_{40}^{16}$, $P_{40}^{17}$, $P_{40}^{18}$, $P_{40}^{19}$, and $P_{40}^{20}$, reach positions remote from the emission source S while diffusing.

The positions of the respective particles, $P_{00}^{01}$ to $P_{00}^{20}$, $P_{20}^{01}$ to $P_{20}^{20}$, and $P_{40}^{01}$ to $P_{40}^{20}$, are determined by calculating the diffusion velocities (u', v', w') of the respective particles, $P_{00}^{01}$ to $P_{00}^{20}$, $P_{20}^{01}$ to $P_{20}^{20}$, and $P_{40}^{01}$ to $P_{40}^{20}$, in the Lagrangian particle dispersion model with the use of the wind field data at 20-second intervals obtained by the RAMS (Regional Atmospheric Modeling System) code, and moving the respective particles based on the results.

For the particles generated at the start of computation, i.e., $P_{00}^{01}$ to $P_{00}^{20}$, 60 seconds have passed since the start of computation (the point in time at which the particles were first generated). Thus, the respective spatial coordinates (xi(t=60), yi(t=60), zi(t=60)) of the respective particles $P_{00}^{01}$ to $P_{00}^{20}$ are recorded, while associated with the post-emission elapsed time Ti(t)=60 seconds, into the data recorder 1 (see FIGS. 1 and 4).

For the particles generated 20 seconds after the start of computation, i.e., $P_{20}^{01}$ to $P_{20}^{20}$, 40 seconds have passed since the start of computation (the point in time at which the particles were first generated). Thus, the respective spatial coordinates (xi(t=60), yi(t=60), zi(t=60)) of the respective particles $P_{20}^{01}$ to $P_{20}^{20}$ are recorded, while associated with the post-emission elapsed time Ti(t)=40 seconds, into the data recorder 1 (see FIGS. 1 and 4).

For the particles generated 40 seconds after the start of computation, i.e., $P_{40}^{01}$ to $P_{40}^{20}$, 20 seconds have passed since the start of computation (the point in time at which the particles were first generated) Thus, the respective spatial coordinates (xi(t=60), yi(t=60), zi(t=60)) of the respective particles $P_{40}^{01}$ to $P_{40}^{20}$ are recorded, while associated with the post-emission elapsed time Ti(t)=20 seconds, into the data recorder 1 (see FIGS. 1 and 4).

As described above, groups of 20 particles are generated successively in respective computation cycles of Δt (20 seconds), and the positions, i.e. spatial coordinates (xi(t), yi(t), zi(t)), of the particles in each computation cycle of Δt (20 seconds) are determined. Moreover, the post-emission elapsed times Ti(t) in the respective computation cycles of Δt are measured, and the spatial coordinates of the respective particles in the respective computation cycles are recorded successively, in association with the post-emission elapsed times of the respective particles in the respective computation cycles, into the data recorder 1.

Figure 5:
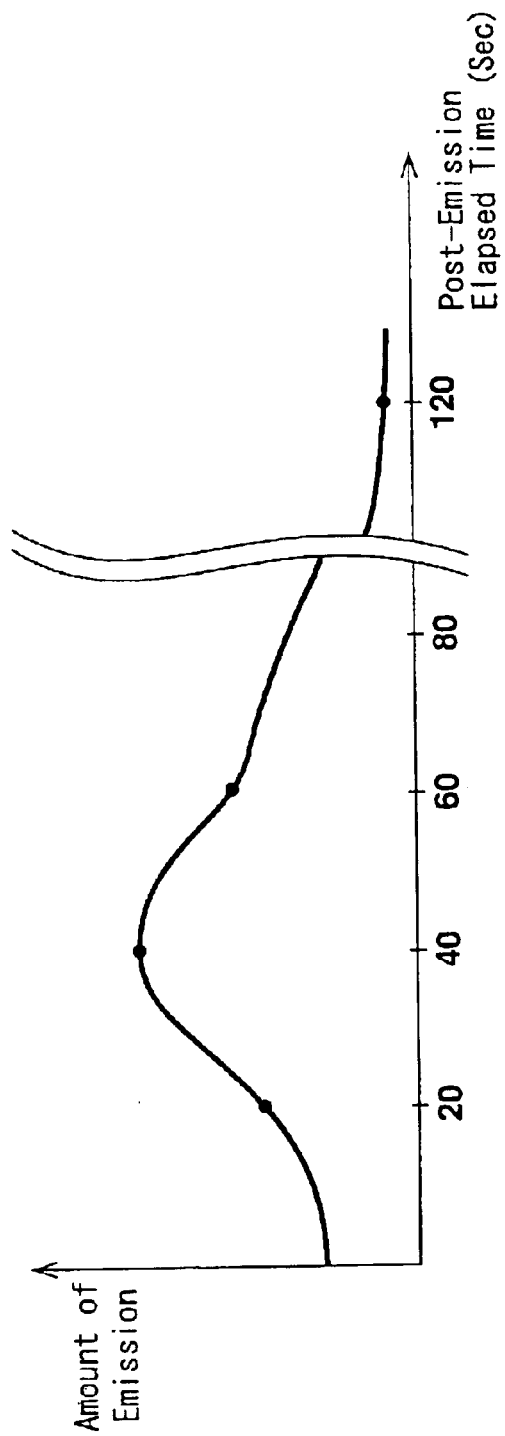
FIG. 5 is a characteristic view showing an example of timewise variations in the amount of emission of a substance.

Next, the processings in the second step (see FIG. 1) are described concretely. In the above-mentioned first step, numerical calculations were carried out, with the amount of emission, Q (m³/sec), of the substance being set at a constant value (=1.0). However, the actual amount of emission of the substance emitted from the emission source S varies often with the passage of the post-emission elapsed time Ti (t), as shown in FIG. 5. Thus, when the amount of emission varies with time in this manner, data as indicated in FIG. 6 are set which show the emission source intensities of particles over the course of the post-emission elapsed time Ti(t) in accordance with the changes in the amount of emission shown in FIG. 5.

Figure 6:
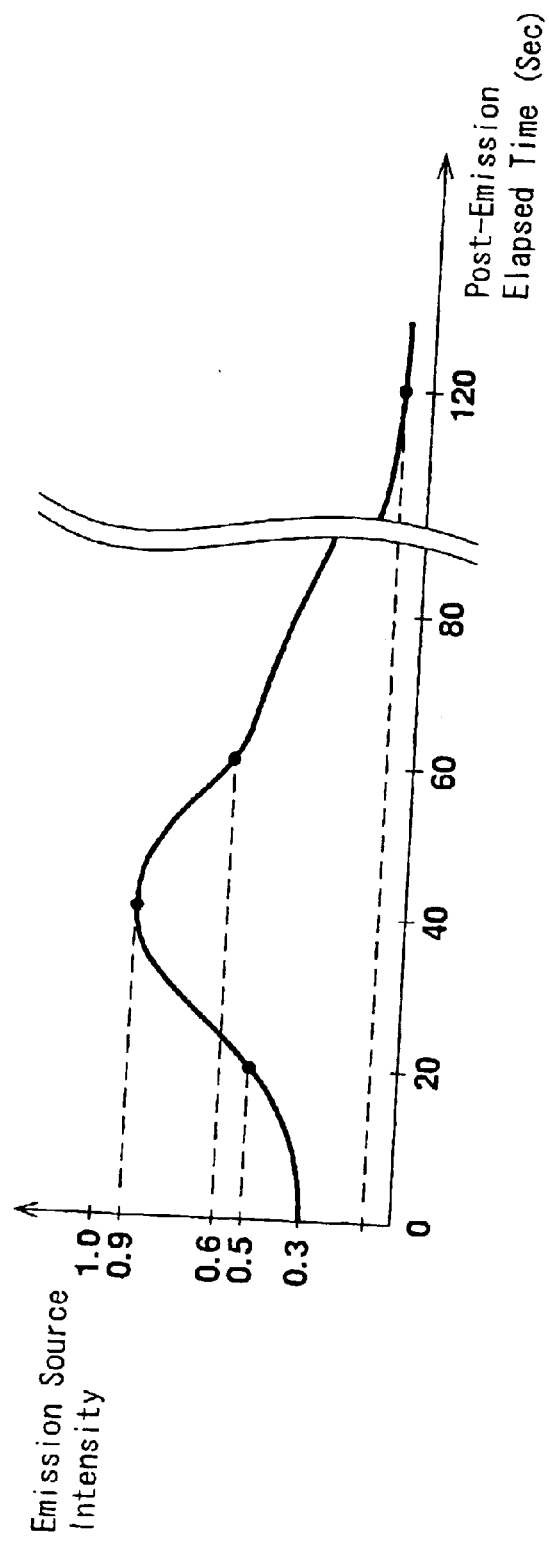
FIG. 6 is a characteristic view showing an example of emission source intensities corresponding to timewise variations in the amount of emission of the substance.

According to the emission source intensity data in FIG. 6, the emission source intensities are 0.3, 0.5, 0.9 and 0.6, for example, at the post-emission elapsed times Ti (t) of 0, 20, 40 and 60 seconds, respectively.

Then, the spatial coordinates of the respective particles and the post-emission elapsed times Ti(t) of the respective particles in the respective computation cycles, which have been stored in the data recorder 1, are read out. Also, the points in time at which the particles were generated are found for the respective particles by reference to the post-emission elapsed times Ti(t). The emission source intensities of the respective particles at these points of time are found from the emission source intensity data shown in FIG. 6. Furthermore, the spatial coordinates of the respective particles, the post-emission elapsed times Ti(t) of the respective particles, and the emission source intensities of the respective particles are associated with each for the respective computation cycles, and rerecorded into the data recorder 1.

A concrete explanation is as follows: As the data at the post-emission elapsed time Ti(t) of 20 seconds (in the first computation cycle), the respective spatial coordinates (xi(t=20), yi(t=20), zi(t=20) ) of the respective particles $P_{00}^{01}$ to $P_{00}^{20}$ have been recorded, in association with the post-emission elapsed time Ti(t)=20 seconds, into the data recorder 1 (see FIG. 2).

Thus, the respective spatial coordinates (xi(t=20), yi(t=20), zi(t=20)) of the respective particles $P_{00}^{01}$ to $P_{00}^{20}$, and the post-emission elapsed time Ti(t)=20 seconds are read out, and the post-emission elapsed time Ti(t)=20 seconds is subtracted from the current time t=20 seconds to obtain the post-emission elapsed time Ti(t)=0 seconds, which is the point in time at which the respective particles $P_{00}^{01}$ to $P_{00}^{20}$ were generated. Then, the emission source intensity of 0.3 at the post-emission elapsed time Ti(t)=0 seconds, when the respective particles $P_{00}^{01}$ to $P_{00}^{20}$ were generated, is obtained from the emission source intensity data shown in FIG. 6.

Then, the respective spatial coordinates (xi(t=20), yi(t=20), zi(t=20)) of the respective particles $P_{00}^{01}$ to $P_{00}^{20}$, the post-emission elapsed time Ti(t)=20 seconds, and the emission source intensity of 0.3 of the respective particles $P_{00}{}^{01}$ to $P_{00}{}^{20}$ are associated with each other, and rerecorded into the data recorder 1.

As the data at the post-emission elapsed time Ti(t)=40 seconds (the second computation cycle), the respective spatial coordinates (xi(t=40), yi(t=40), zi(t=40)) of the respective particles $P_{00}{}^{01}$ to $P_{00}{}^{20}$ associated with the post-emission elapsed time Ti(t)=40 seconds, and the respective spatial coordinates (xi(t=40), yi(t=40), zi(t=40)) of the respective particles $P_{20}{}^{01}$ to $P_{20}{}^{20}$ associated with the post-emlssion elapsed time Ti(t)=20 seconds have been stored in the data recorder 1 (see FIG. 3).

Thus, the respective spatial coordinates (xi(t=40), yi(t=40), zi(t=40)) of the respective particles $P_{00}{}^{01}$ to $P_{00}{}^{20}$, and the post-emission elapsed time Ti(t)=40 seconds are read out, and the post-emission elapsed time Ti(t)=40 seconds is subtracted from the current time t=40 seconds to obtain the post-emission elapsed time Ti(t)=0 seconds, the point in time at which the respective particles $P_{00}{}^{01}$ to $P_{00}{}^{20}$ were generated. Moreover, the emission source intensity of 0.3 at the post-emission elapsed time Ti(t)=0 seconds, when the respective particles $P_{00}{}^{01}$ to $P_{00}{}^{20}$ were generated, is obtained from the emission source intensity data shown in FIG. 6.

Similarly, the respective spatial coordinates (xi(t=40), yi(t=40), zi(t=40)) of the respective particles $P_{20}{}^{01}$ to $P_{20}{}^{20}$, and the post-emission elapsed time Ti(t)=20 seconds are read out, and the post-emission elapsed time Ti(t)=20 seconds is subtracted from the current time t=40 seconds to obtain the post-emission elapsed time Ti(t)=20 seconds, the point in time at which the respective particles $P_{20}{}^{01}$ to $P_{20}{}^{20}$ were generated. Moreover, the emission source intensity of 0.5 at the post-emission elapsed time Ti(t)=20 seconds, when the respective particles $P_{00}{}^{01}$ to $P_{00}{}^{20}$ were generated, is obtained from the emission source intensity data shown in FIG. 6.

The respective spatial coordinates (xi(t=40), yi(t=40), zi(t=40)) of the respective particles $P_{00}{}^{01}$ to $P_{00}{}^{20}$, the post-emission elapsed time Ti(t)=40 seconds, and the emission source intensity of 0.3 of the respective particles $P_{00}{}^{01}$ to $P_{00}{}^{20}$ are associated with each other, and rerecorded into the data recorder 1.

Besides, the respective spatial coordinates (xi(t=40), yi(t=40), zi(t=40)) of the respective particles $P_{20}{}^{01}$ to $P_{20}{}^{20}$ the post-emission elapsed time Ti(t)=20 seconds, and the emission source intensity of 0.5 of the respective particles $P_{20}{}^{01}$ to $P_{20}{}^{20}$ are associated with each other, and rerecorded into the data recorder 1.

As the data at the post-emission elapsed time Ti(t)=60 seconds (the third computation cycle), the respective spatial coordinates (xi(t=60), yi(t=60), zi(t=60)) of the respective particles $P_{00}{}^{01}$ to $P_{00}{}^{20}$ to associated with the post-emission elapsed time Ti(t)=60 seconds, the respective spatial coordinates (xi(t=60), yi(t=60), zi(t=60)) of the respective particles $P_{20}{}^{01}$ to $P_{20}{}^{20}$ associated with the post-emission elapsed time Ti(t)=40 seconds, and the respective spatial coordinates (xi(t=60), yi(t=60), zi(t=60)) of the respective particles $P_{40}{}^{01}$ to $P_{40}{}^{20}$ associated with the post-emission elapsed time Ti(t)=20 seconds have been stored in the data recorder 1 (see FIG. 4).

Thus, the respective spatial coordinates (xi(t=60), yi(t=60), zi(t=60)) of the respective particles $P_{00}{}^{01}$ to $P_{00}{}^{20}$, and the post-emission elapsed time Ti(t)=60 seconds are read out, and the post-emission elapsed time Ti(t)=60 seconds is subtracted from the current time t=60 seconds to obtain the post-emission elapsed time Ti(t)=0 seconds, the point in time at which the respective particles $P_{00}{}^{01}$ to $P_{20}{}^{20}$ were generated. The emission source intensity of 0.3 at the post-emission elapsed time Ti(t)=0 seconds, when the respective particles $P_{00}{}^{01}$ to $P_{00}{}^{20}$ were generated, is obtained from the emission source intensity data shown in FIG. 6.

Similarly, the respective spatial coordinates (xi(t=60), yi(t=60), zi(t=60)) of the respective particles $P_{20}{}^{01}$ to $P_{20}{}^{20}$, and the post-emission elapsed time Ti(t)=40 seconds are read out, and the post-emission elapsed time Ti(t)=40 seconds is subtracted from the current time t=60 seconds to obtain the post-emission elapsed time Ti(t)=20 seconds, the point in time at which the respective particles $P_{20}{}^{01}$ to $P_{20}{}^{20}$ were generated. The emission source intensity of 0.5 at the post-emission elapsed time Ti(t)=20 seconds, when the respective particles $P_{20}{}^{01}$ to $P_{20}{}^{20}$ were generated, is obtained from the emission source intensity data shown in FIG. 6.

Similarly, the respective spatial coordinates (xi(t=60), yi(t=60), zi(t=60)) of the respective particles $P_{40}{}^{01}$ to $P_{40}{}^{20}$, and the post-emission elapsed time Ti(t)=20 seconds are read out, and the post-emission elapsed time Ti(t)=20 seconds is subtracted from the current time t=60 seconds to obtain the post-emission elapsed time Ti(t)=40 seconds, the point in time at which the respective particles $P_{40}{}^{01}$ to $P_{40}{}^{20}$ were generated. The emission source intensity of 0.9 at the post-emission elapsed time Ti(t)=40 seconds, when the respective particles $P_{40}{}^{01}$ to $P_{4020}$ were generated, is obtained from the emission source intensity data shown in FIG. 6.

Then, the respective spatial coordinates (xi(t=60), yi(t=60), zi(t=60)) of the respective particles $P_{00}{}^{01}$ to $P_{00}{}^{20}$, the post-emission elapsed time Ti(t)=60 seconds, and the emission source intensity of 0.3 of the respective particles $P_{00}{}^{01}$ to $P_{00}{}^{20}$ are associated with each other, and rerecorded into the data recorder 1.

Also, the respective spatial coordinates (xi(t=60), yi(t=60), zi(t=60)) of the respective particles $P_{20}{}^{01}$ to $P_{20}{}^{20}$, the post-emission elapsed time Ti(t)=40 seconds, and the emission source intensity of 0.5 of the respective particles $P_{20}{}^{01}$ to $P_{20}{}^{20}$ are associated with each other, and rerecorded into the data recorder 1.

Moreover, the respective spatial coordinates (xi(t=60), yi(t=60), zi(t=60)) of the respective particles $P_{40}{}^{01}$ to $P_{40}{}^{20}$, the post-emission elapsed time Ti(t)=20 seconds, and the emission source intensity of 0.9 of the respective particles $P_{40}{}^{01}$ to $P_{40}{}^{20}$ are associated with each other, and rerecorded into the data recorder 1.

In subsequent computation cycles as well, similar processing computations are performed, and the spatial coordinates of the respective particles, the post-emission elapsed times Ti(t), and the emission source intensities of the respective particles are associated with each other and rerecorded into the data recorder.

Figure 7:
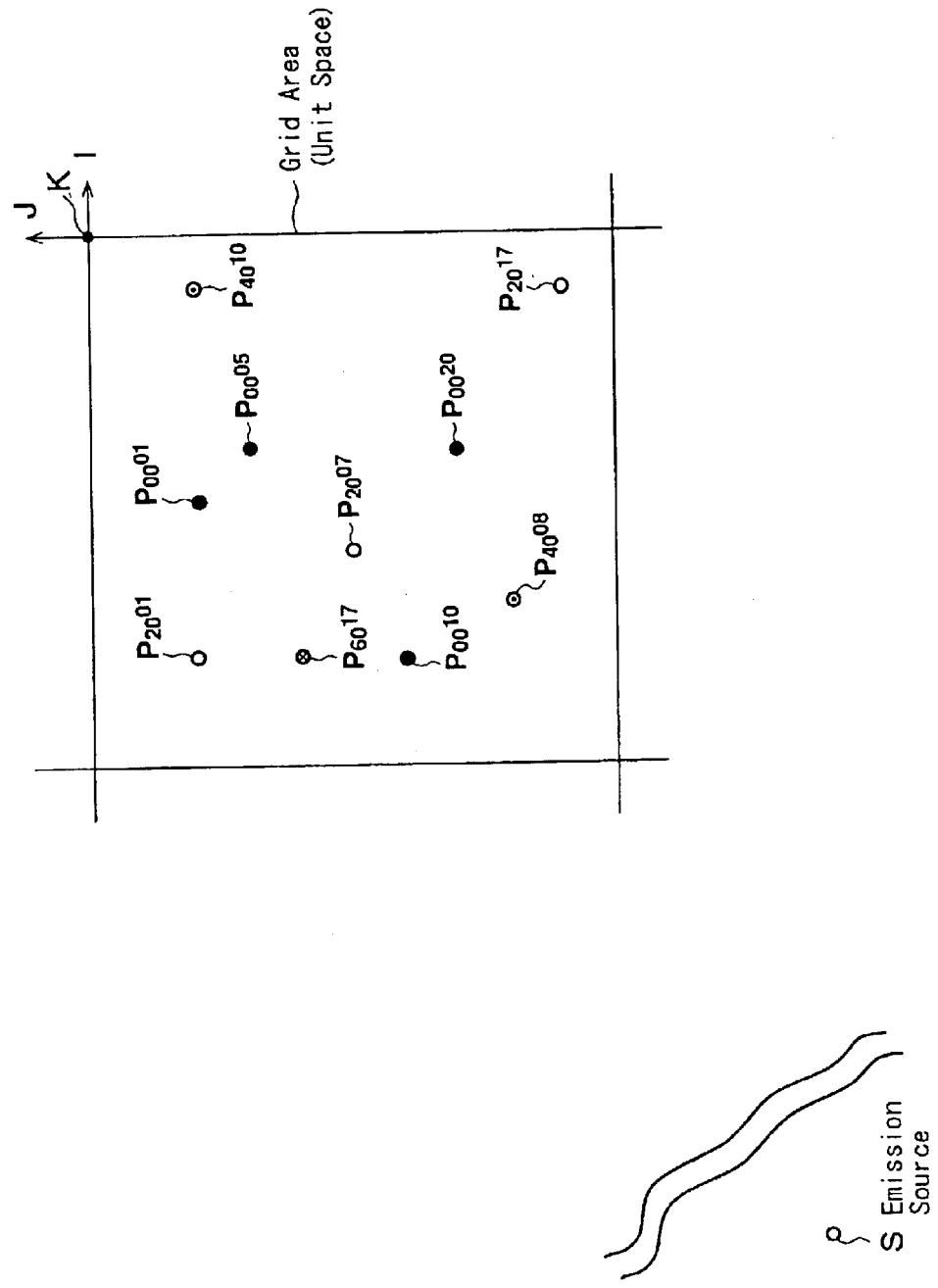
FIG. 7 is an explanation drawing showing the distribution of particles in a predetermined grid area.

Next, the processings in the third step (see FIG. 1) are described concretely. For example, let it be assumed that the concentration of the substance in a predetermined grid area (a unit space in a unit volume) I,J,K spaced a predetermined distance from the emission source S shown in FIG. 7 is calculated at the post-emission elapsed time Ti(t)=120 seconds. For this purpose, the particles existent in this grid area at the post-emission elapsed time Ti(t)=120 seconds are read out of the data recorder 1. If the readings show the existence of the particles as indicated in FIG. 7, the emission source intensities possessed by these respective particles are summed, whereby the concentration of the substance in this unit space can be calculated.

That is, the following particles are present in the grid area shown in FIG. 7:

the four particles with the intensity of 0.3, i.e. $P_{00}^{01}$, $P_{00}^{05}$, $P_{00}^{10}$ and $P_{00}^{20}$, the three particles with the intensity of 0.5, i.e. $P_{20}^{01}$, $P_{20}^{07}$ and $P_{20}^{17}$, the two particles with the intensity of 0.9, i.e. $P_{40}^{08}$ and $P_{40}^{10}$, and the one particle with the intensity of 0.6, i.e. $P_{60}^{17}$.

Thus, the emission source intensities of these particles are added up in the following manner, whereby the concentration of the substance in this unit space can be calculated at 5.1:

$$(0.3 \times 4) + (0.5 \times 3) + (0.9 \times 2) + (0.6 \times 1) = 5.1$$

Figure 8:
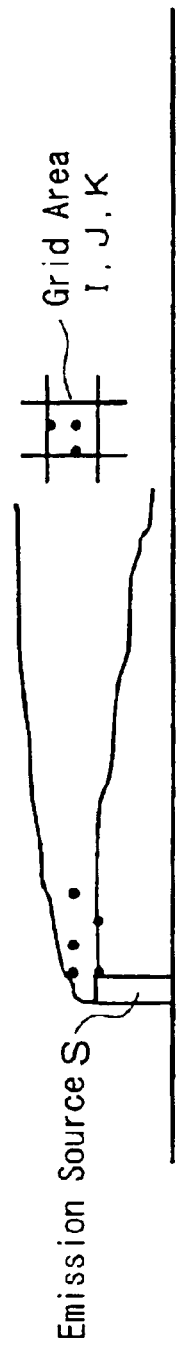
FIG. 8 is an explanation drawing showing an emission source and the grid area.
Figure 9:
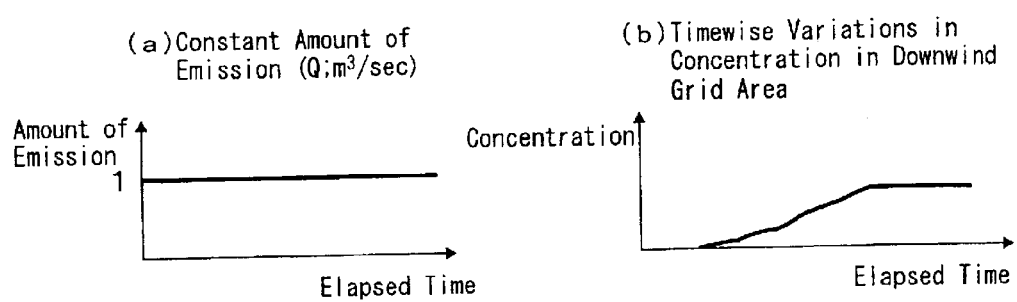
FIGS. 9($a$) and 9($b$) are characteristic views showing the relationship between the amount of emission and the concentration when the amount of emission is constant.
Figure 10:
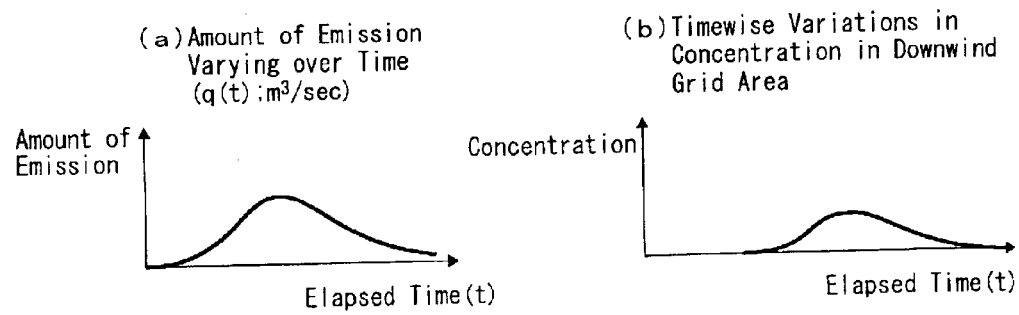
FIGS. 10(a) and 10(b) are characteristic views showing the relationship between the amount of emission and the concentration when the amount of emission varies with time.

The above-mentioned first embodiment will be explained generally (mathematically) as follows: In the first embodiment, as shown in FIG. 8, when the substance (gaseous body or the like) is emitted from the emission source S, the substance concentration (gas concentration) in the grid area I,J,K downwind of the emission source S is predicted according to changes in time. Furthermore, when the amount Q of emission of the substance is constant as shown in FIG. 9(a), timewise variations in the concentration in the grid area I,J,K can, of course, be predictively computed as shown in FIG. 9(b). Even when the amount of emission of the substance is the amount q(t) of emission varying over time as shown in FIG. 10(a), timewise variations in the concentration in the grid area can be predictively computed as shown in FIG. 10(b).

In the first embodiment, processings are performed as follows: Whether the amount of emission of the substance actually emitted from the emission source S is constant or varies with the passage of time, the substance is replaced by particles, and computations are carried out, with the use of the conventional Lagrangian particle dispersion model, with the amount of emission, $Q$ ($m^3/sec$), of the substance being set at a constant value (=1.0). According to this model, N particles per second are generated from the emission source S, and the behavior of each particle is numerically calculated to obtain the spatial coordinates ($xi(t)$, $yi(t)$, $zi(t)$) showing the position of each particle. Furthermore, in addition to the spatial coordinates ($xi(t)$, $yi(t)$, $zi(t)$), information possessed by each particle, the post-emission elapsed time Ti (t), time which has elapsed since the initial generation of the particles, is recorded into the data recorder in each computation cycle of $\Delta t$. By this means, the timewise variations in the concentration distribution corresponding to every amount q(t) of emission varying with time can be measured with the use of the conventional Lagrangian particle dispersion model.

For this purpose, data are set which show the emission source intensities of particles along the time course of the post-emission elapsed time Ti(t) in proportion to the amount q(t) of emission of the substance varying with time. The spatial coordinates ($xi(t)$, $yi(t)$, $zi(t)$) showing the positions of the respective particles, and the post-emission elapsed time Ti (t), at a certain point of time (t), are read off from the data recorder.

In the case of the constant amount of emission (Q=1.0), the emission source intensity of each particle is $Q/N$ ($m^3$) = $1/N$. In the case of the amount q(t) of emission varying with time, on the other hand, the emission source intensity of each particle is $q(t-Ti)/N$ ($m^3$).

In addition to the spatial coordinates ($xi(t)$, $yi(t)$, $zi(t)$), which are information possessed by each particle, the post-emission elapsed time Ti(t), and the emission source intensity of each particle, $qi(t-Ti)/N$ ($m^3$), are recorded again into the data recorder at each point of time (t).

According to the present embodiment utilizing the Lagrangian particle model, the post-emission elapsed time, and the emission source intensity $qi(t-Ti)/N$ ($m^3$) corresponding to the amount g(t) of emission varying with time, there are differences in the emission source intensity among the respective particles present in the unit volume (=1 $m^3$ of air) in the space. Thus, $\Sigma qi(t-Ti)/N$ ($m^3$), the sum of the emission source intensities $qi(t-Ti)/N$ ($m^3$) of the respective particles, represents the amount of gas present in this unit volume. Hence, the gas concentration in this space is $\Sigma qi(t-Ti)/N$ ($m^3$)/N (gas $m^3$/air $m^3$).

<Second Embodiment (a Plurality of Emission Sources)>

When a plurality of (j) emission sources are present and a substance is emitted in different amounts of emission (qi(t)) varying with time from the respective emission sources, emission source identification information (si) is imparted to each particle, in addition to the particle information (position, post-emission elapsed time) of the Lagrangian particle dispersion model used in the first embodiment. By this means, the same function as in the first embodiment can be performed.

Figure 11:
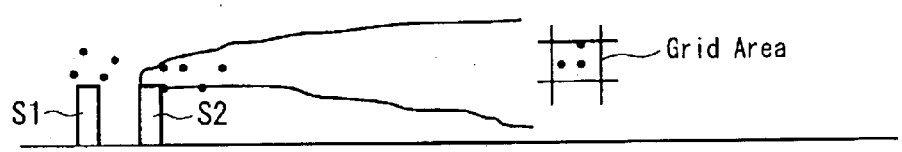
FIG. 11 is an explanation drawing showing two emission sources and the grid area according to a second embodiment of the present invention.

If two emission sources, S1 and S2, are existent as shown in FIG. 11, for example, particles emitted from the emission source S1 are assigned emission source identification information s1, while particles emitted from the emission source S2 are assigned emission source identification information s2. Using the Lagrangian particle dispersion model, the substance is replaced by particles, N particles per second are generated from each of the emission sources S1 and S2 and the behavior of each particle is numerically calculated to obtain spatial coordinates ($xi(t)$, $yi(t)$, $zi(t)$) showing the position of each particle. In addition to the spatial coordinates ($xi(t)$, $yi(t)$, $zi(t)$), which are information each particle possesses, each particle is assigned the post-emission elapsed time Ti(t), which is the time elapsed since the first generation of the particle, and the emission source identification information s1 or s2.

Figure 12:
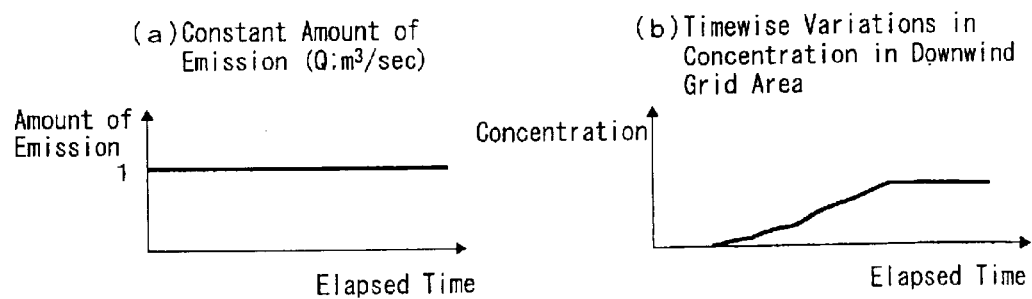
FIGS. 12(a) and 12(b) are characteristic views showing the relationship between the amount of emission and the concentration when the amount of emission is constant.

With the amount Q of emission from each of the emission sources S1 and S2 being set at a constant value (=1), as shown in FIG. 12(a), timewise variations in the concentration of the substance in the grid area I,J,K as shown in FIG. 12(b) are obtained with the use of the conventional Lagrangian particle dispersion model, and recorded.

Figure 13:
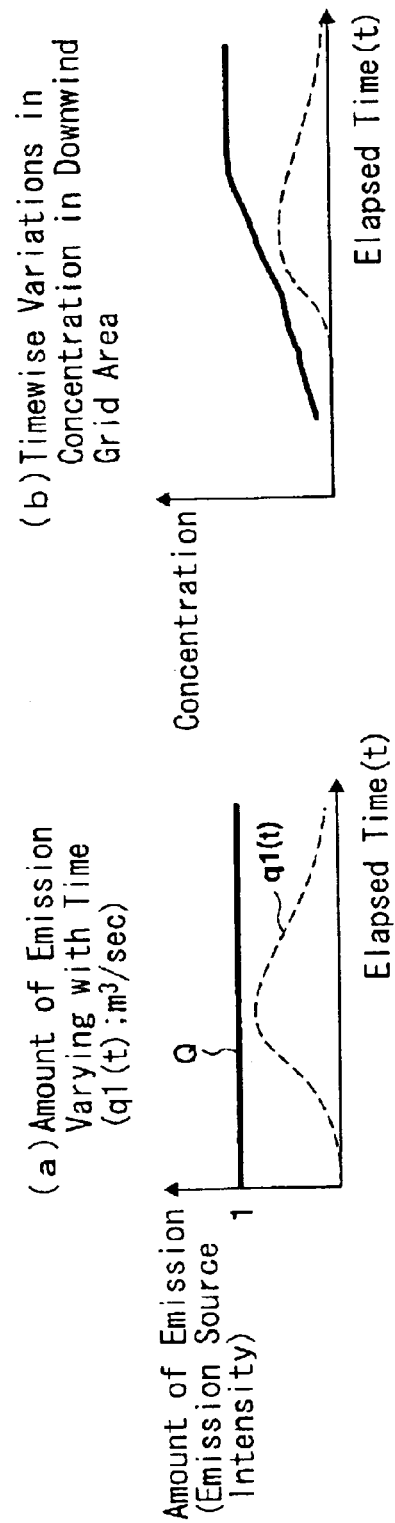
FIGS. 13(a) and 13(b) are characteristic views showing the relationship between the amount of emission and the concentration when the amount of emission varies with time.

Assume that the amount of emission of the substance emitted from the emission source S1 is q1(t) varying with time, as shown by a dashed line in FIG. 13(a). In this case, the particles emitted from the emission source S1 have the emission source intensity of q1(t) according to the same method as in the first embodiment. For each particle, the emission source intensity is set by reference to the emission source intensity q1(t) at the point in time at which the particle was generated. The emission source intensities of the particles having the emission source identification information s1 in the targeted grid area I,J,K are added up. In this manner, timewise variations in the concentration of the substance (the substance concentration in the targeted grid area I,J,K) emitted from the emission source S1 can be found.

Similarly, assume that the amount of emission of the substance emitted from the emission source S2 is q2(t). In this case, the particles emitted from the emission source S2 are assumed to have the emission source intensity of q2(t) in the same manner as in the first embodiment. For each particle, the emission source intensity is set by reference to the emission source intensity q2(t) at the point in time at which the particle was generated. The emission source intensities of the particles having the emission source identification information s2 in the targeted grid area I,J,K are added up. In this manner, time wise variations in the concentration of the substance (the substance concentration in the targeted grid area I,J,K) emitted from the emission source S2 can be found.

Then, the timewise variations in the concentration of the substance emitted from the emission source S1, and the timewise variations in the concentration of the substance emitted from the emission source S2 are added together, whereby the concentration of the substance in the targeted grid area I,J,K can be found.

<Third Embodiment>

The third embodiment involves a method according to which, after a gas leakage accident happens, for example, the concentration distributions at present and in the future are calculated in short periods of time based on the results of actual measurement of the amount of emission of the gas.

Diffusion calculation, such as in environmental impact assessment, does not urgently require the results of the calculation. Thus, after the amount q(t) of emission of gas varying with the passage of time is determined, predictive computation of the diffusion status of the gas is performed over the course of several days to several months. In an emergency such as a gas leakage accident, on the other hand, measures for evacuation of the residents nearby should be taken urgently, so that the results of diffusion calculation need to be outputted in as short a time as possible.

Figure 14:
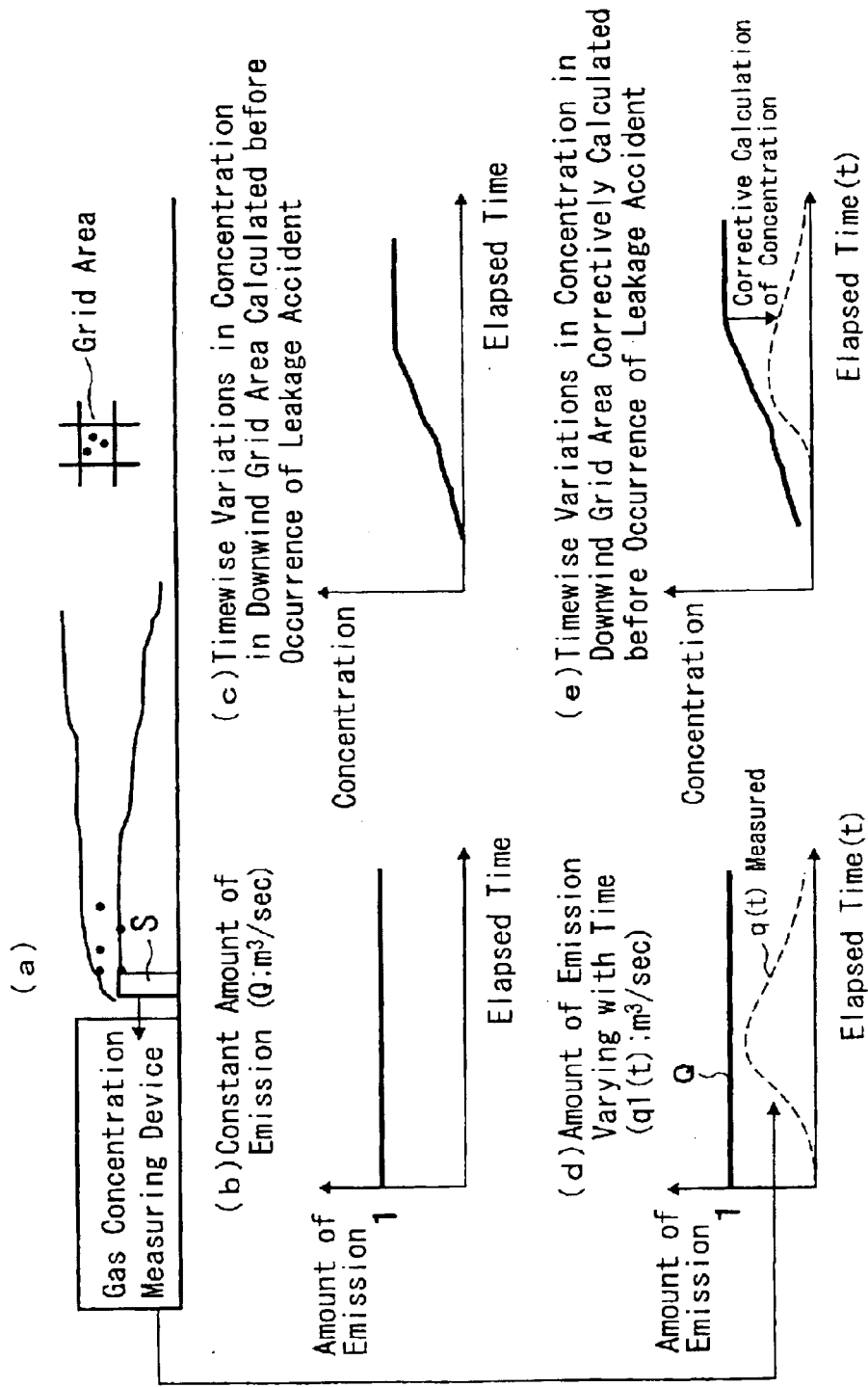
FIGS. 14(a) to 14(e) are explanation drawings showing a third embodiment of the present invention.

In this case, diffusion calculations at a constant emission rate (Q=1) are carried out for 24 consecutive hours using the same Lagrangian particle dispersion model as in the first embodiment as shown in FIGS. 14(*a*), 14(*b*) and 14(*c*) based on the three-dimensional space wind velocity distributions at each point of time.

After the gas leakage accident happens, the actual gas emission amount q(t) is measured by a gas concentration measuring device installed at the exit of a chimney, the emission source. In accordance with the actually measured gas emission amount q(t), the emission source intensity q(t) of each particle is set, whereby time wise variations in the concentration in response to the gas emission amount can be correctively calculated in the same manner as in the first embodiment (see FIGS. 14(*d*) and 14(*e*)). That is, for each particle, the emission source intensity is set (FIG. 14(*d*)) by reference to the emission source intensity q(t) at the point in time at which the particle was generated. In the targeted grid area I,J,K, the emission source intensities of the particles present in this area are added up. In this manner, timewise variations in the concentration of the substance (the substance concentration in the targeted grid area I,J,K) emitted from the emission source S can be found.

The gas emission amount in the future is set to be equivalent to the current actually measured gas emission amount q(t), or is calculated based on a separately formulated predictive equation.

The methods for calculating current and future three-dimensional space wind velocity distributions include methods for calculating timewise variations in meteorological data (wind direction, wind speed, atmospheric temperature) in detailed grids (several kilometers to several tens of meters) in accordance with broad area meteorological prediction models (RAMS, MM5, etc.) with the use of meteorological data (GPV: Grid Point Value) in broad area grids (20 km) which are periodically delivered from the Japan Meteorological Agency or the like.

<Fourth Embodiment>

The fourth embodiment involves a method according to which, after a gas leakage accident happens, for example, the current amount of emission of the gas is calculated in a short time based on the results of actual measurement of the concentration in the surroundings of the site of leakage.

Figure 15:
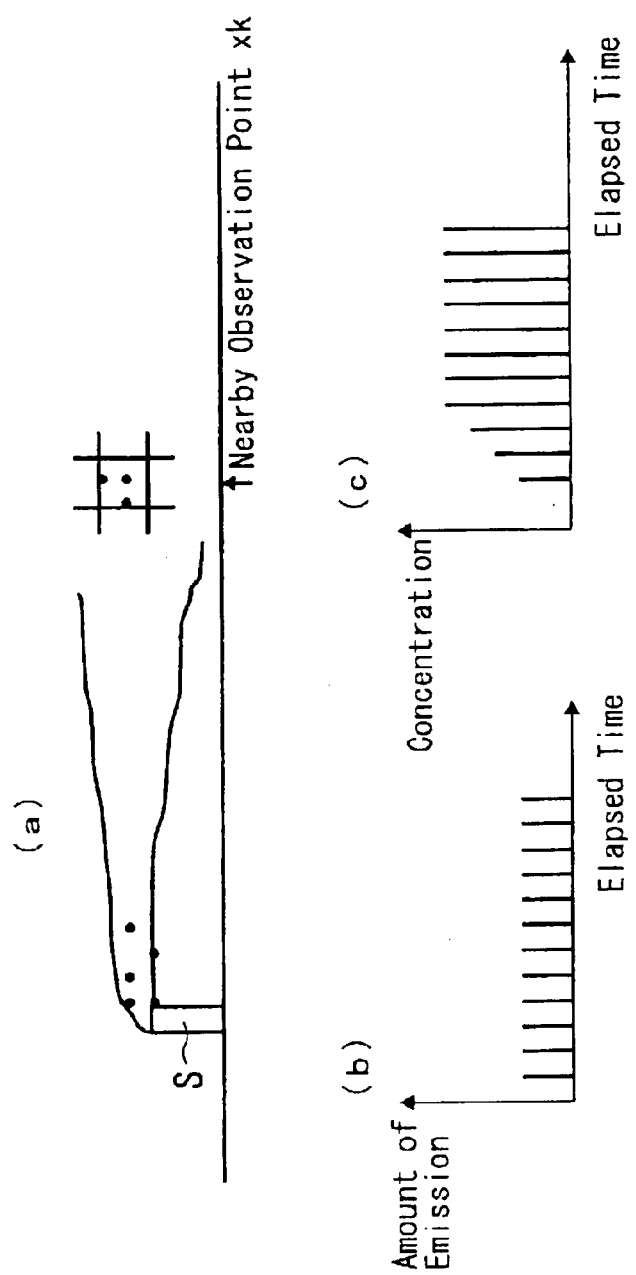
FIGS. 15(a) to 15(c) are explanation drawings showing a fourth embodiment of the present invention.

When the gas leakage accident occurred, it is often difficult to measure the amount of emission, q(t), from a gas leakage source S, the emission source, shown in FIG. 15(*a*). In this case, the amount of emission, q(t), can be estimated in a short time with the use of the Lagrangian particle dispersion model in the first embodiment based on timewise variations in the concentration (ck(t) observed) measured at an observation point (xk) in the neighborhood of the site of leakage.

Before the occurrence of the leakage accident, the concentration (Ck(t) calculated) at a certain nearby observation point (xk) is calculated (see FIG. 15(*c*)) at a constant emission amount (Q=1) (see FIG. 15(*b*)) with the use of the Lagrangian particle dispersion model in the first embodiment.

This concentration (Ck(t) calculated) is calculated from the following equation (10) using the particles (n particles) present in a three-dimensional space volume ($\Delta x \times \Delta y \times \Delta z$) centered about the observation point (xk):

$$Ck(t) \text{ calculated} = n \times \Sigma Q(t-Ti)/N$$

$$/(\Delta x \times \Delta y \times \Delta z) \tag{10}$$

where the emission amount Q(t−Ti) is at a constant value (=1).

Then, timewise variations in the concentration (Ck(t) observed) at the observation point (xk) are measured, whereupon an equation (11) is formulated using the equation (10).

$$(Ck(t) \text{ observed}) = n0 \times \Sigma q$$

$$0(t-0)/N/(\Delta x \times \Delta y \times \Delta z) + n$$

$$1 \times \Sigma q1(t-\Delta T)/N$$

$$/(\Delta x \times \Delta y \times \Delta z) + n2 \times \Sigma q$$

$$2(t-2 \cdot \Delta T)/N$$

$$/(\Delta x \times \Delta y \times \Delta z) + n3 \times \Sigma q$$

$$3(t-3 \cdot \Delta T)/N$$

$$/(\Delta x \times \Delta y \times \Delta z) + n4 \times \Sigma q$$

$$4(t-4 \cdot \Delta T)/N$$

$$/(\Delta x \times \Delta y \times \Delta z) + \ldots + nl \times \Sigma ql$$

$$(t-t)/N/(\Delta x \times \Delta y \times \Delta z) + C$$

$$0(t) \tag{11}$$

where n0, n1, n2, n3 and nl, respectively, represent the total number of particles which were emitted 0 seconds, $\Delta T$ seconds, ($\Delta T \times 2$) seconds, ($\Delta T \times 3$) seconds, and t seconds after start of emission, and which are present in the three-dimensional space volume ($\Delta x \times \Delta y \times \Delta z$) centered about the observation point (xk).

C0(t) is called a background concentration, the concentration of particles present regardless of the location of observation, the particles having been released from other sites than the emission source to be included in the calculation. This concentration either takes a constant value, or varies with time t.

q0, q1, q2, q3 and ql represent emission rates 0 seconds, $\Delta T$ seconds, $(\Delta T \times 2)$ seconds, $(\Delta T \times 3)$ seconds, and t $(=\Delta T \times l)$ seconds after start of emission, respectively.

The Ck(t) observed is measured for 24 consecutive hours. Thus, (1+l) of these Ck(t) observed values can be measured from start of emission until 0 seconds, $\Delta T$ seconds, $(\Delta T \times 2)$ seconds, $(\Delta T \times 3)$ seconds, and t $(=\Delta T \times l)$ seconds after start of emission. If there are k of the observation points xk, kx(1+l) of the observation data can be obtained.

Figure 16:
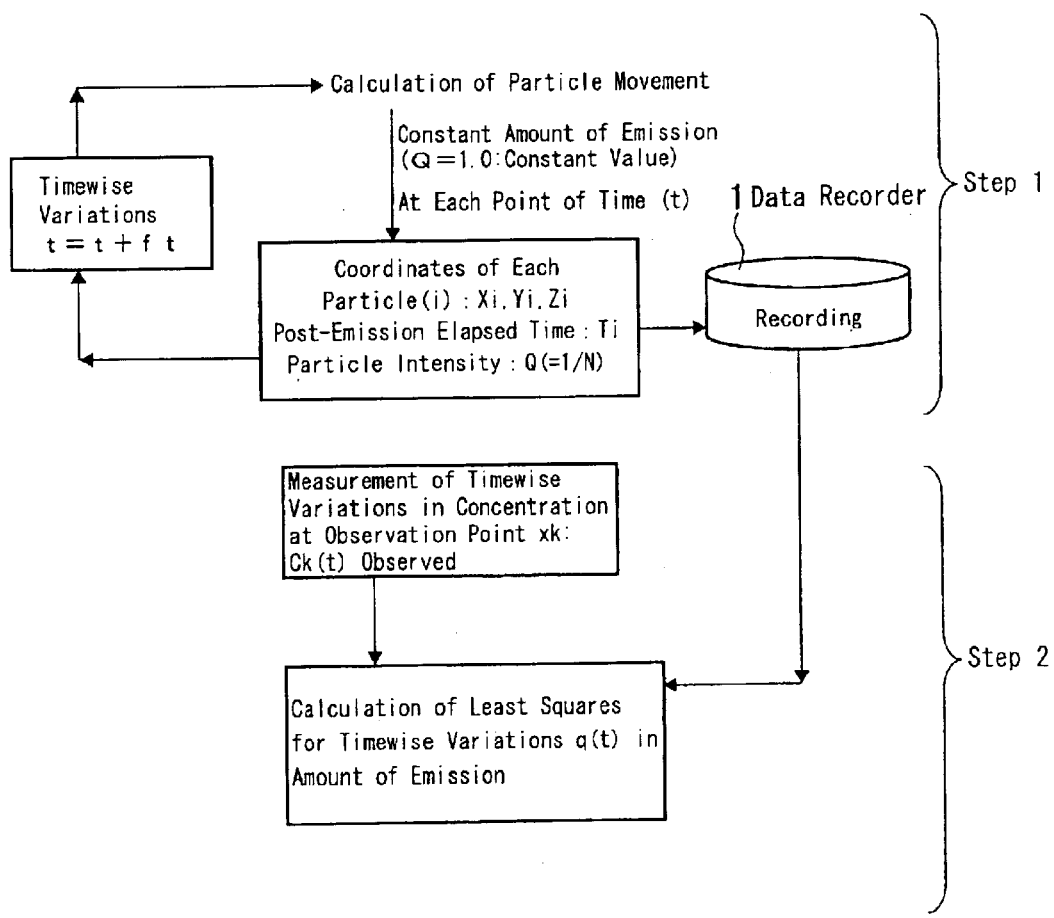
FIG. 16 is a flow chart showing the flow of calculations in the fourth embodiment of the present invention.

In the equation (11), there are (1+l) unknown quantities, i.e., q0, q1, q2, q3 ... ql, and kx(1+l) of the Ck(t) observed values as known quantities. Thus, the unknown quantities are fewer than the known quantities. In this case, the unknown quantities q0, q1, q2, q3 ... ql can be determined using the method of least squares such that least square errors relative to the observed concentrations (Ck(t) observed) are minimized. FIG. 16 is a flow chart showing the calculations in the fourth embodiment.

<Fifth Embodiment>

The fifth embodiment involves a method according to which, after a gas leakage accident happens, for example, the current amount of emission of the gas is estimated in a short time based on the results of actual measurement of the concentration in the surroundings of the site of leakage, and the distribution of the concentration is calculated based on the estimates.

According to the fourth embodiment, the amount of emission, q(t), can be estimated in a short time with the use of the Lagrangian particle dispersion model in the first embodiment based on timewise variations in the concentration (Ck(t) observed) measured at an observation point (xk) in the neighborhood of the site of leakage.

Figure 17:
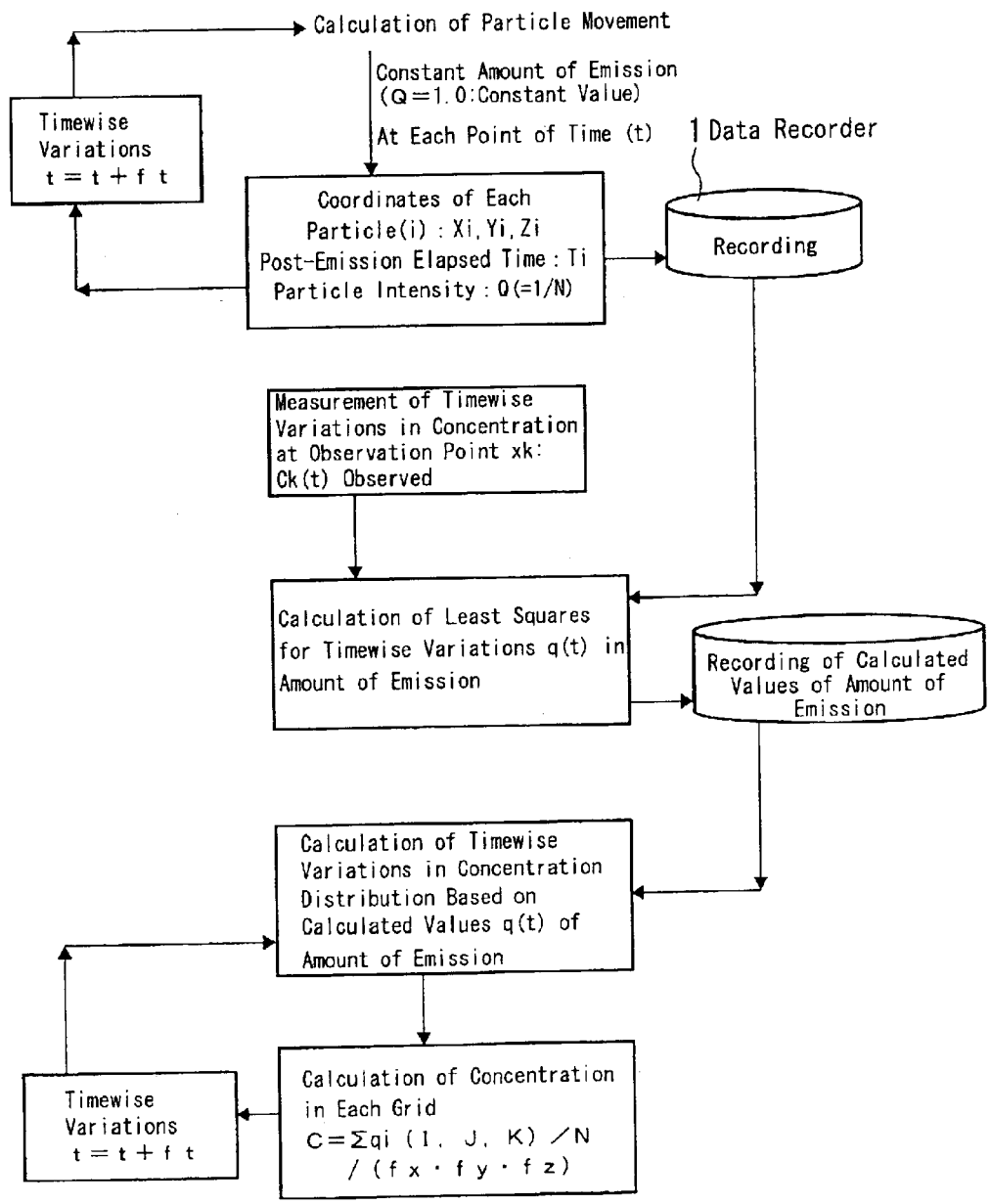
FIG. 17 is a flow chart showing the flow of calculations in a fifth embodiment of the present invention.

As shown in FIG. 17, before the occurrence of the leakage accident, the concentration (Ck(t) calculated) at a certain nearby observation point (xk) is calculated at a constant emission rate (Q=1) with the use of the Lagrangian particle dispersion model of the first embodiment.

This concentration (Ck(t) calculated) was calculated from the following equation (12) using the particles (n particles) present in a three-dimensional space volume $(\Delta x \times \Delta y \times \Delta z)$ centered about the observation point (xk):

$$Ck(t) \text{ calculated} = n \times \Sigma Q(t-Ti)/N/(\Delta x \times \Delta y \times \Delta z) \quad (12)$$

where the emission rate Q(t–Ti) is at a constant value (=1).

Then, timewise variations in the concentration (Ck(t) observed) at the observation point (xk) are measured, whereupon an equation (13) is formulated using the equation (12).

$$(Ck(t) \text{ observed}) = n0 \times \Sigma q$$
$$0(t-0)/N/(\Delta x \times \Delta y \times \Delta z) + n$$
$$1 \times \Sigma q1(t-\Delta T)/N$$
$$/(\Delta x \times \Delta y \times \Delta z) + n2 \times \Sigma q$$
$$2(t-2 \cdot \Delta T)/N$$
$$/(\Delta x \times \Delta y \times \Delta z) + n3 \times \Sigma q$$
$$3(t-3 \cdot \Delta T)/N$$
$$/(\Delta x \times \Delta y \times \Delta z) + n4 \times \Sigma q$$
$$4(t-4 \cdot \Delta T)/N$$
$$/(\Delta x \times \Delta y \times \Delta z) + \ldots + nl \times \Sigma ql$$
$$(t-t)/N/(\Delta x \times \Delta y \times \Delta z) + C$$
$$0(t) \quad (13)$$

where n0, n1, n2, n3 and nl represent, respectively, the total number of particles which were emitted 0 seconds, $\Delta T$ seconds, $(\Delta T \times 2)$ seconds, $(\Delta T \times 3)$ seconds, and t seconds after start of emission, and which are present in the three-dimensional space volume $(\Delta x \times \Delta y \times \Delta z)$ centered about the observation point (xk)

C0(t) is called a background concentration, the concentration of particles present regardless of the location of observation, the particles having been released from other sites than the emission source to be included in the calculation. This concentration either takes a constant value, or varies with time t.

q0, q1, q2, q3 and ql represent emission rates 0 seconds, $\Delta T$ seconds, $(\Delta T \times 2)$ seconds, $(\Delta T \times 3)$ seconds, and t $(=\Delta T \times l)$ seconds after start of emission, respectively.

The Ck(t) observed is measured for 24 consecutive hours. Thus, (1+l) of these Ck(t) observed values can be measured from the start of emission until 0 seconds, $\Delta T$ seconds, $(\Delta T \times 2)$ seconds, $(\Delta T \times 3)$ seconds, and t $(=\Delta T \times l)$ seconds after start of emission. If there are k of the observation points xk, kx(1+l) of the observation data can be obtained.

In the equation (13), there are (1+l) unknown quantities, i.e., q0, q1, q2, q3 ... ql, and kx(1+l) of the Ck(t) observed values as known quantities. Thus, the unknown quantities are fewer than the known quantities. In this case, the unknown quantities q0, q1, q2, q3 ... ql can be determined using the method of least squares such that least square errors relative to the observed concentrations (Ck(t) observed) are minimized.

Using the estimated values q0, q1, q2, q3 ... ql, timewise variations in the concentration are correctively calculated by the method of the first embodiment, whereby the concentration distributions at the respective elapsed times can be calculated.

<Sixth Embodiment>

The sixth embodiment involves a system according to which, after a gas leakage accident happens, the concentration distributions at present and in the future are calculated in short periods of time based on the results of actual measurement of the amount of emission of the gas, and the results are supplied by the Internet.

In an emergency such as a gas leakage accident, measures for evacuation of the residents nearby should be taken urgently, so that the results of diffusion calculation need to be outputted in as short a time as possible. However, it is not known when such a leakage accident occurs. Hence, the fire departments, the police and the municipalities, which are the supervisory authorities, and different factories, which are business organizations, have to manage and operate relevant computer systems around the clock.

This management and operation requires huge effort and cost and advanced computer operating techniques, and thus is difficult for organizations other than those which permanently have a large-scale risk management system.

As a method for relieving this problem, an information supply system utilizing the recent Internet has been worked out.

Figure 18:
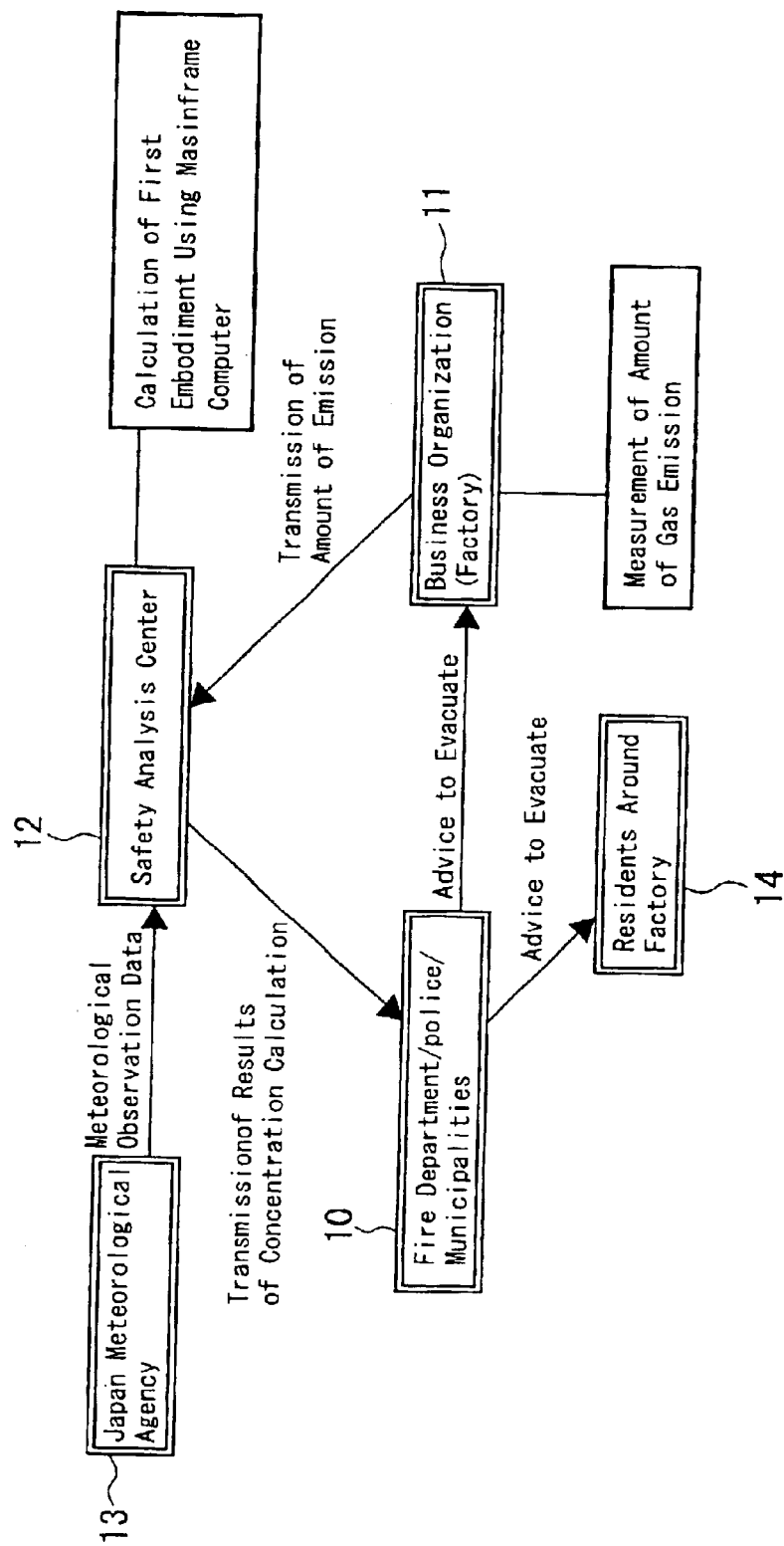
FIG. 18 is a system configuration drawing showing a system according to a sixth embodiment of the present invention.
Figure 19:
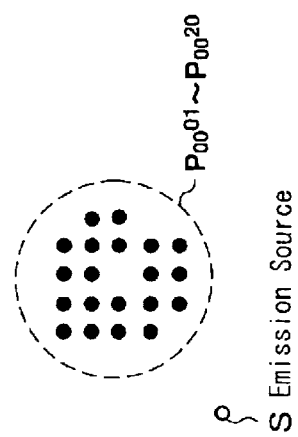
FIG. 19 is an explanation drawing showing the diffusion state of particles in an earlier technology.
Figure 20:
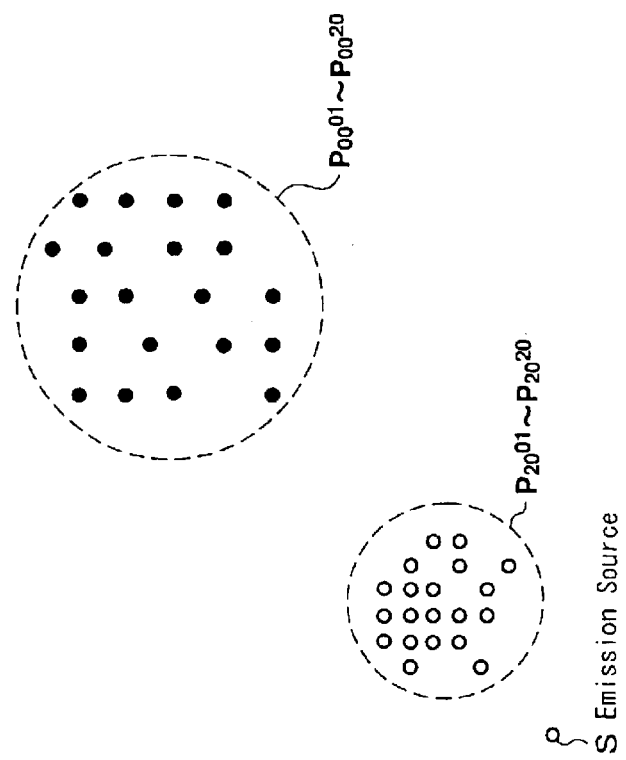
FIG. 20 is an explanation drawing showing the diffusion state of particles in the earlier technology.
Figure 21:
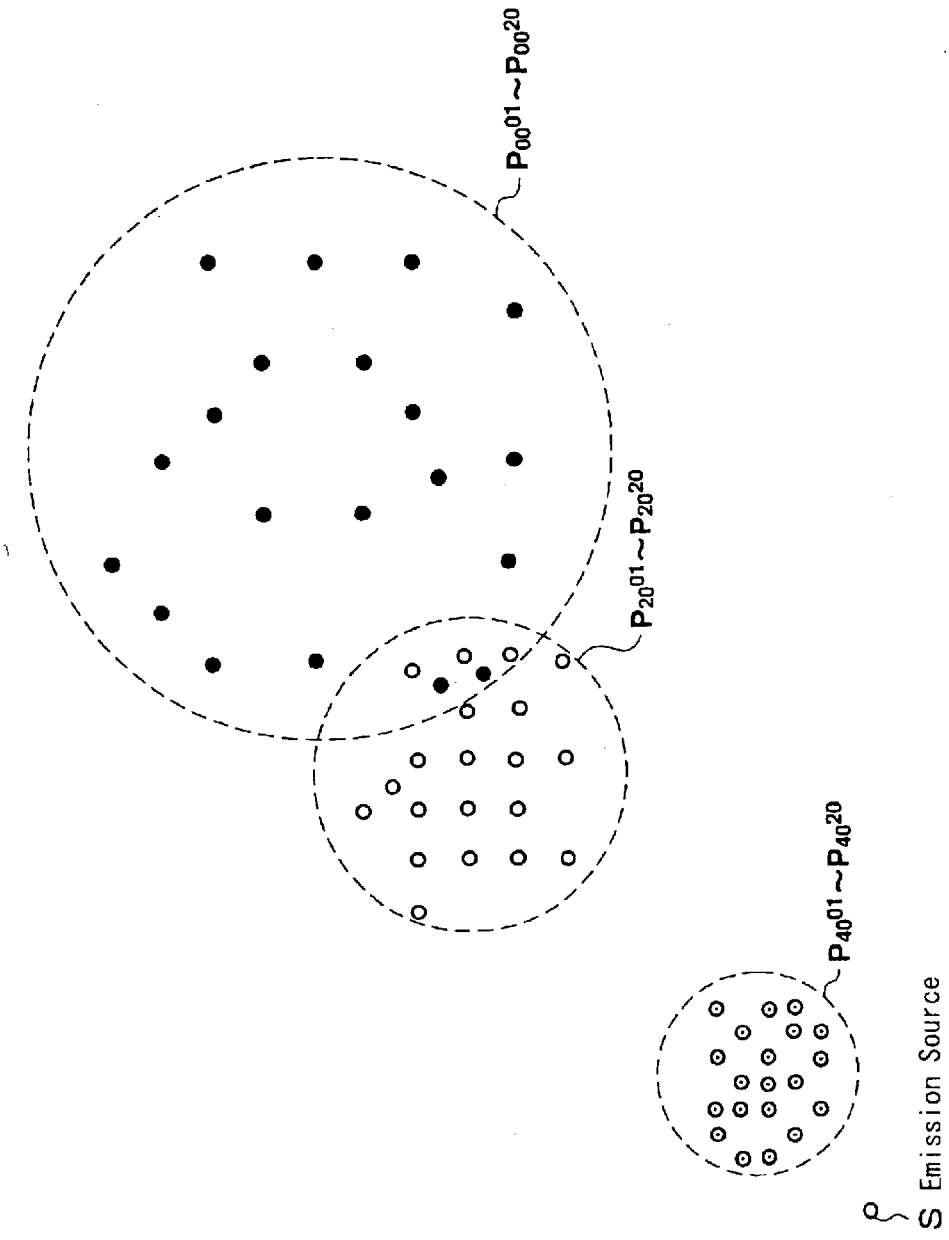
FIG. 21 is an explanation drawing showing the diffusion state of particles in the earlier technology.
Figure 22:
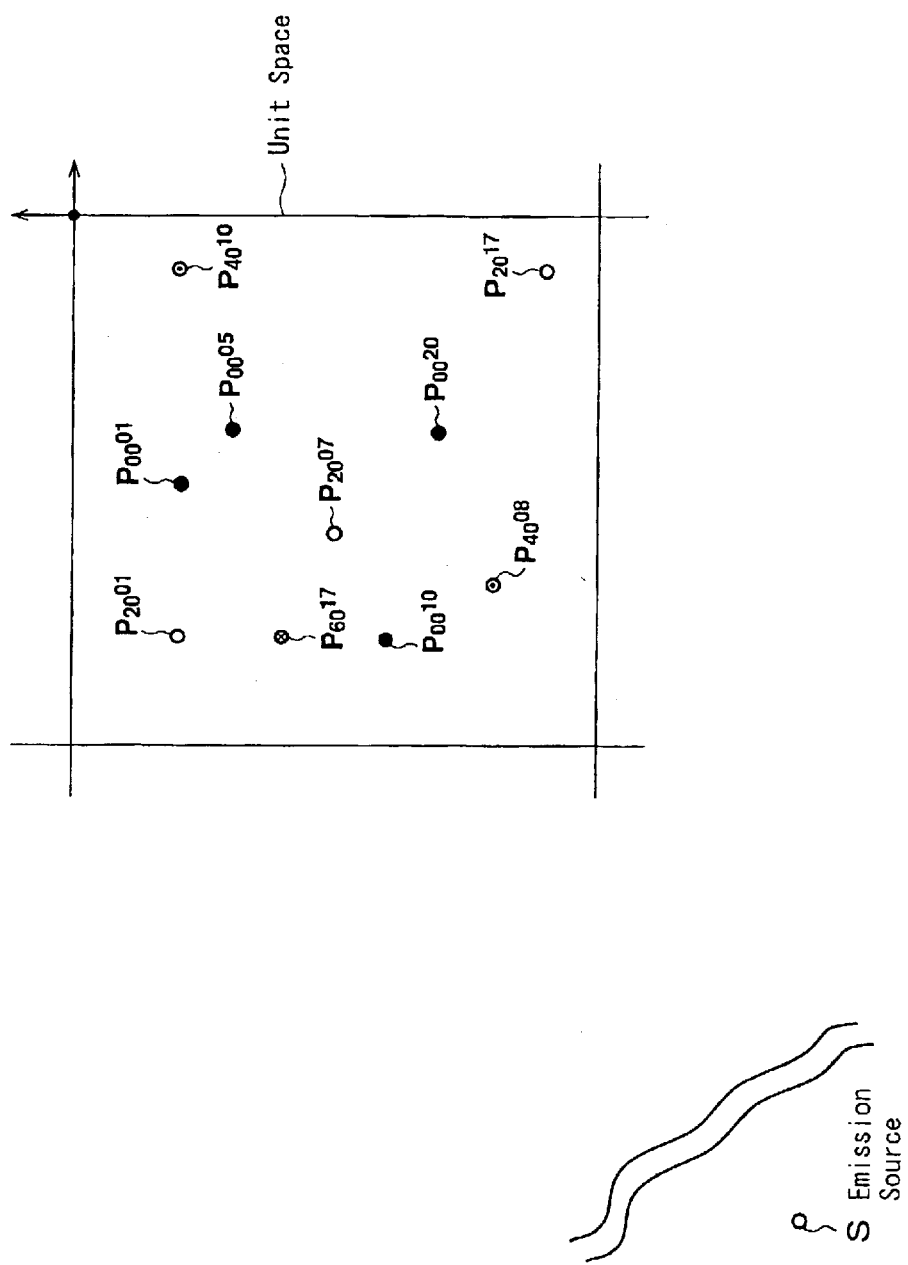
FIG. 22 is an explanation drawing showing the distribution of particles in a predetermined grid area according to the earlier technology.
Figure 23:
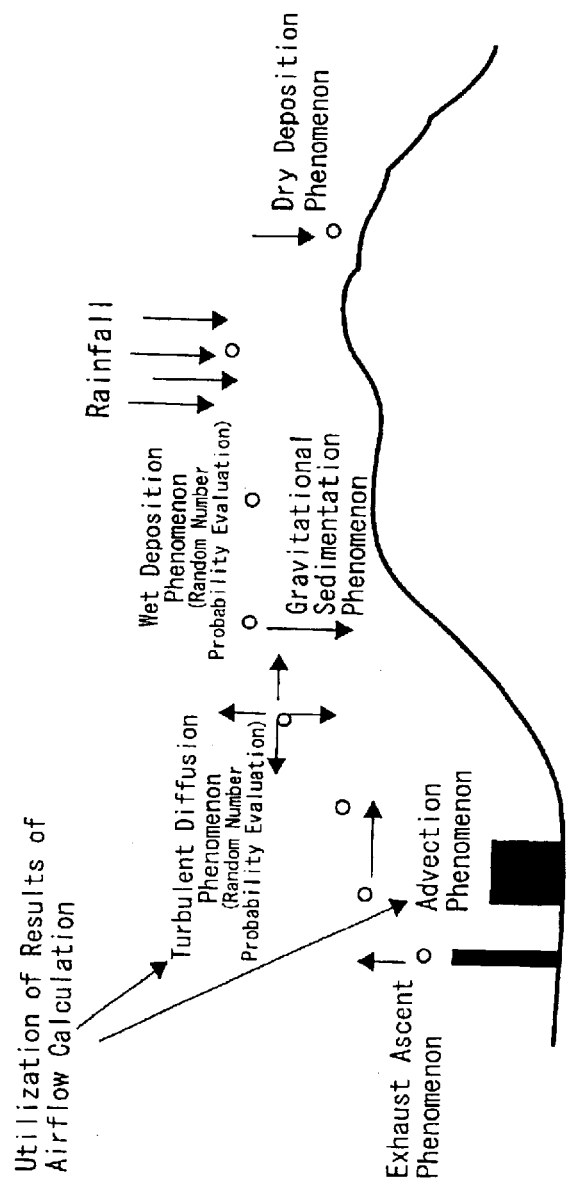
FIG. 23 is an explanation drawing showing the functions of a particle diffusion model.
Figure 26:
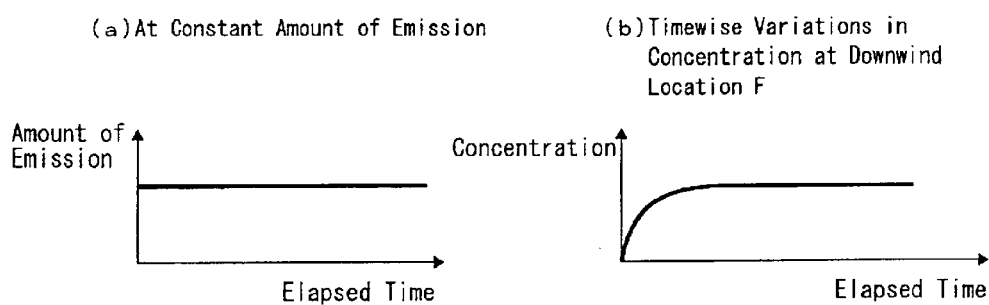
FIGS. 26(a) and 26(b) are characteristic views showing the relationship between the amount of emission and the concentration when the amount of emission is constant.
Figure 27:
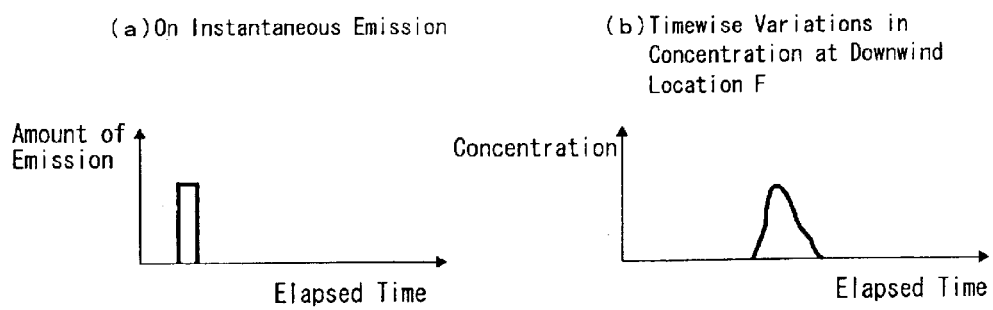
FIGS. 27(a) and 27(b) are characteristic views showing the relationship between the amount of emission and the concentration when emission is instantaneous.

According to this sixth embodiment, as shown in FIG. 18, a safety analysis center 12 is established at a location different from the sites of supervisory authorities 10, such as the fire departments, the police and the municipalities, and factories 11, which are business organizations. The safety analysis center 12 receives meteorological observation data delivered from meteorological data delivery facilities, such as the Japan Meteorological Agency 13, via information transfer means such as the Internet. In normal times, the safety analysis center 12 makes calculations using a mainframe computer, and carries out diffusion calculations at a constant emission rate (Q=1) for 24 consecutive hours according to the same Lagrangian particle dispersion model as in the first embodiment based on the three-dimensional space wind velocity distributions at different points of time.

If, after occurrence of a gas leakage accident, the actual gas emission amount q(t) is shown by a gas concentration measuring device or the like installed at the exit of a chimney of the business organization 11, this gas emission amount q(t) is communicated to the safety analysis center 12 via information transfer means such as the Internet. Upon receipt of this information, the safety analysis center 12 can correctively calculate timewise variations in the concentration, corresponding to the gas emission rate, in the same manner as in the first embodiment.

The safety analysis center 12 transmits the results of the concentration calculations to the supervisory authorities 10, such as the fire department, the police and the municipalities. The supervisory authorities 10 advise the business organization 11 and residents 14 near the factory to evacuate, depending on the concentration.

The gas emission rate in the future is set to be equivalent to the current gas emission rate q(t) actually measured, or is calculated based on a separately formulated predictive equation. If a plurality of the business organizations 11 are present, the safety analysis center 12 performs computations as shown in the second embodiment to predict timewise variations in the concentration.

The methods for calculating current and future three-dimensional space wind velocity distributions include methods for calculating timewise variations in meteorological data (wind direction, wind speed, atmospheric temperature) in detailed grids (several kilometers to several tens of meters) in accordance with broad area meteorological prediction models (RAMS, MM5, etc.) with the use of meteorological observation data (GPV: Grid Point Value) in broad area grids (20 km) which are periodically delivered from the Japan Meteorological Agency 13.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:

1. A diffusion status prediction method for a diffused substance, comprising the steps of:

making a setting such that a substance emitted from an emission source into an atmosphere is replaced by many particles, and a preset number of the particles are generated from a position of the emission source in each of computation cycles, in order to predict a status of diffusion of the emitted substance into the atmosphere;

substituting wind field data, which are obtained at many locations in an area including the position of the emission source and which show a wind direction and a wind speed varying with passage of time, into a diffusion equation for computing a diffusion state of the particles, to find diffusion velocities of the respective particles; finding spatial coordinates, which show spatial positions where the respective particles are present, from the diffusion velocities in each of the computation cycles; also measuring a post-emission elapsed time, which is a time elapsed since the particles were first generated; and recording the spatial coordinates of the respective particles and the post-emission elapsed time of the respective particles in each computation cycle into a data recorder, with the spatial coordinates and the post-emission elapsed time being associated with each other;

setting emission source intensity data on the particles over a time course of the post-emission elapsed time in proportion to variations in an amount of emission of the emitted substance over the time course of the post-emission elapsed time;

reading out the spatial coordinates of the respective particles and the post-emission elapsed time of the respective particles in each computation cycle which have been recorded in the data recorder, and also finding a point of time, at which the respective particles were generated, by reference to the post-emission elapsed time read out; finding an emission source intensity of the respective particles at this point of time from the emission source intensity data; and rerecording the spatial coordinates of the respective particles, the post-emission elapsed time of the respective particles, and the emission source intensity of the respective particles in each computation cycle into the data recorder, with the spatial coordinates, the post-emission elapsed time, and the emission source intensity being associated with each other; and determining a concentration of the substance in a predetermined area in a predetermined computation cycle by adding together the emission source intensities of all the particles present in the predetermined area in the predetermined computation cycle.

2. A diffusion status prediction method for a diffused substance, comprising the steps of:

making a setting such that a substance emitted from a plurality of emission sources into an atmosphere is replaced by many particles, and a preset number of the particles are generated from a position of each of the emission sources in each of computation cycles, in order to predict a status of diffusion of the emitted substance into the atmosphere;

substituting wind field data, which are obtained at many locations in an area including the positions of the emission sources and which show a wind direction and a wind speed varying with passage of time, into a diffusion equation for computing a diffusion state of the particles, to find diffusion velocities of the respective particles; finding spatial coordinates, which show spatial positions where the respective particles are present, from the diffusion velocities in each of the computation cycles; also measuring a post-emission elapsed time, which is a time elapsed since the particles were first generated; and recording the spatial coordinates of the respective particles, the post-emission elapsed time of the respective particles, and emission source identification information for identification of either of the emission sources in each computation cycle, into a data recorder, with the spatial coordinates, the post-emission elapsed time, and the emission source identification information being associated with each other;

setting, for each of the emission sources, emission source intensity data on the particles along a time course of the post-emission elapsed time in proportion to variations in an amount of emission, along the time course of the post-emission elapsed time, of the substance emitted from each of the emission sources;

reading out the spatial coordinates of the respective particles, the post-emission elapsed time of the respective particles, and the emission source identification information on the respective particles in each computation cycle which have been recorded in the data recorder, and also finding a point of time, at which the respective particles were generated, by reference to the post-emission elapsed time read out; finding an emission source intensity of the respective particles at the point of time, at which the particles were generated, from the emission source intensity data corresponding to the emission source, where the particles were generated, by reference to the emission source identification information read out; and rerecording the spatial coordinates of the respective particles, the post-emission elapsed time of the respective particles, and the emission source intensity of the respective particles in each computation cycle into the data recorder, with the spatial coordinates, the post-emission elapsed time, and the emission source intensity being associated with each other; and determining a concentration of the substance in a predetermined area in a predetermined computation cycle by adding together the emission source intensities of all the particles present in the predetermined area in the predetermined computation cycle.

3. A diffusion status prediction method for a diffused substance according to claim 1 or 2, wherein the emission source intensity data which are set have been obtained by measuring the concentration of the substance actually emitted from the emission source.

4. A diffusion status prediction method for a diffused substance according to claim 1 or 2, wherein the emission source intensity data are set based on timewise variations in the concentration of the substance measured at an observation point in surroundings of the emission source.

5. A diffusion status prediction system for a diffused substance, comprising:

a business organization which, when the diffused substance is emitted into an atmosphere, measures a concentration of the diffused substance and transmits data showing an amount of emission of the diffused substance;

a meteorological data delivery facility for delivering meteorological observation data;

supervisory authorities for advising the business organization and residents in a neighborhood of the business organization to evacuate; and a safety analysis center for performing computations as defined in claim 1 or 2 to compute the concentration of the substance in the predetermined area, and wherein:

the safety analysis center receives the data showing the amount of emission of the diffused substance transmitted from the business organization, and the meteorological observation data transmitted from the meteorological data delivery facility, via information transfer means;

the supervisory authorities receive the concentration of the substance transmitted from the safety analysis center via the information transfer means; and the supervisory authorities give advice to evacuate, depending on the concentration of the substance transmitted.

* * * * *